US011300990B2

(12) United States Patent
Battlogg

(10) Patent No.: US 11,300,990 B2
(45) Date of Patent: Apr. 12, 2022

(54) INPUT DEVICE AND METHOD FOR OPERATING AN INPUT DEVICE

(71) Applicant: INVENTUS ENGINEERING GMBH, St. Anton I. M. (AT)

(72) Inventor: Stefan Battlogg, St. Anton I. M. (AT)

(73) Assignee: INVENTUS Engineering GmbH, St. Anton i.M (AT)

( * ) Notice: Subject to any disclaimer, the term of this patent is extended or adjusted under 35 U.S.C. 154(b) by 110 days.

(21) Appl. No.: 16/804,709

(22) Filed: Feb. 28, 2020

(65) Prior Publication Data

US 2020/0272193 A1 Aug. 27, 2020

Related U.S. Application Data

(63) Continuation-in-part of application No. 15/563,675, filed as application No. PCT/EP2016/057162 on Mar. 31, 2016, now abandoned.

(30) Foreign Application Priority Data

Mar. 31, 2015 (DE) ...................... 10 2015 104 927.9

(51) Int. Cl.
 *G05G 5/03* (2008.04)
 *G05G 5/06* (2006.01)
 (Continued)

(52) U.S. Cl.
 CPC ............. *G05G 9/047* (2013.01); *F16F 9/535* (2013.01); *F16H 7/00* (2013.01); *G05G 5/02* (2013.01);
 (Continued)

(58) Field of Classification Search
 CPC .. G05G 5/02; G05G 5/03; G05G 5/04; G05G 5/05; G05G 5/06; G05G 5/26;
 (Continued)

(56) References Cited

U.S. PATENT DOCUMENTS 5,598,908 A * 2/1997 York ....................... F16D 37/02
 188/267
5,734,373 A * 3/1998 Rosenberg .............. A63F 13/06
 345/161

(Continued)

FOREIGN PATENT DOCUMENTS

CN 108278319 A * 7/2018
DE 10029191 A1 * 12/2001 ............. H03K 17/97
(Continued)

*Primary Examiner* — Thomas J Williams
(74) *Attorney, Agent, or Firm* — Laurence A. Greenberg; Werner H. Stemer; Ralph E. Locher

(57) ABSTRACT

An input device, such as a joystick, has an operating device, a magnetorheological brake device, and a controller for activating the brake device. An operating lever is disposed on a supporting structure for pivoting around at least one pivot axis. The brake device is coupled with the pivot axis for controlled damping of a pivoting motion of the operating lever. The brake device has a rotary damper with two components, namely, an inside component and an outside component. The outside component radially surrounds the inside component and a damping gap is formed in between that is filled with a magnetorheological medium. The damping gap can be exposed to a magnetic field to damp a pivoting motion between the two contrapivoting components about an axis. One of the components has radial arms equipped with an electric coil whose winding extends adjacent to and spaced apart from the axis.

18 Claims, 14 Drawing Sheets

Figure 1:
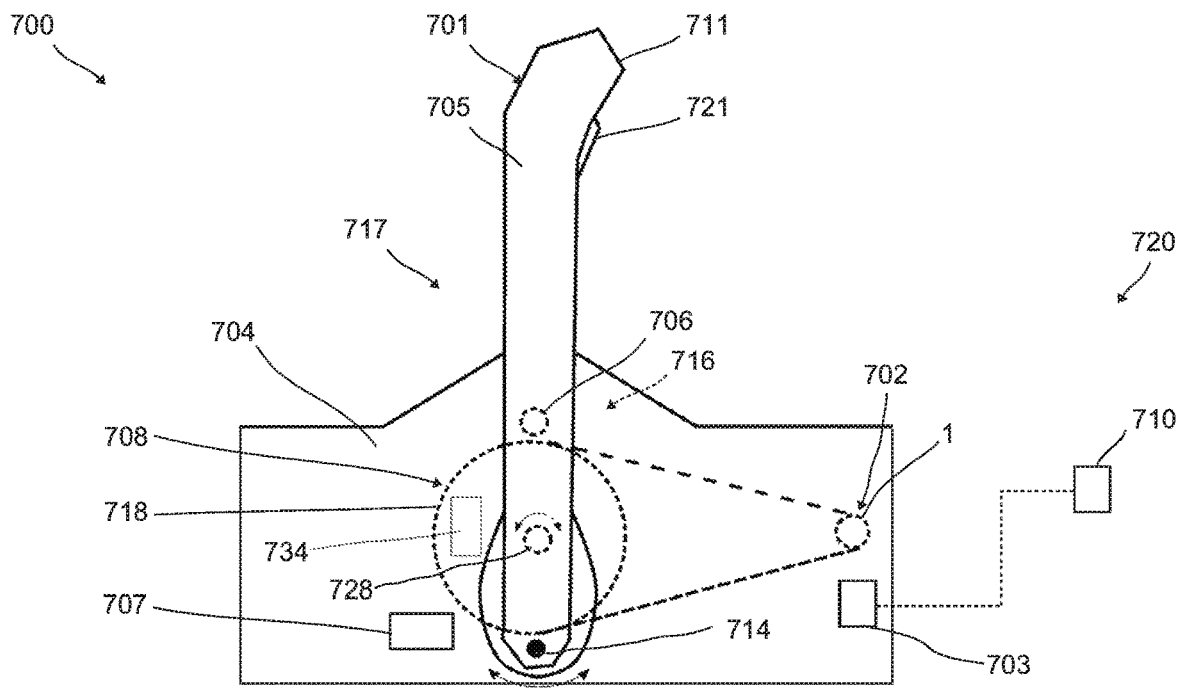

(51) Int. Cl.
*F16F 9/53* (2006.01)
*G05G 9/047* (2006.01)
*G05G 5/05* (2006.01)
*G05G 5/26* (2006.01)
*G05G 5/04* (2006.01)
*F16H 7/00* (2006.01)
*G05G 5/02* (2006.01)

(52) U.S. Cl.
CPC .......... *G05G 5/03* (2013.01); *G05G 5/04* (2013.01); *G05G 5/05* (2013.01); *G05G 5/06* (2013.01); *G05G 5/26* (2013.01); *G05G 2009/0477* (2013.01); *G05G 2009/04766* (2013.01); *G05G 2009/04774* (2013.01); *G05G 2505/00* (2013.01)

(58) Field of Classification Search
CPC ......... G05G 9/047; G05G 2009/04749; G05G 2009/04766; G05G 2009/0477; G05G 2009/04774; F16F 9/53; F16F 9/532; F16F 9/533; F16F 9/535
See application file for complete search history.

(56) References Cited

U.S. PATENT DOCUMENTS

| | | | |
|---|---|---|---|
| 6,186,290 B1 * | 2/2001 | Carlson | F16D 57/002 188/161 |
| 6,681,905 B2 * | 1/2004 | Edmondson | B60G 13/001 188/130 |
| 7,278,522 B2 | 10/2007 | Reinhardt et al. | |
| 7,624,850 B2 * | 12/2009 | Namuduri | F16F 9/535 188/267.2 |
| 7,686,143 B2 * | 3/2010 | Namuduri | B60G 17/0152 188/267.2 |
| 8,424,656 B2 * | 4/2013 | Hiemenz | F16F 9/537 188/267.2 |
| 9,093,214 B2 * | 7/2015 | Gurocak | F16F 9/53 |
| 9,399,495 B2 | 7/2016 | Pierini et al. | |
| 10,054,186 B2 | 8/2018 | Battlogg et al. | |
| 2003/0188594 A1 * | 10/2003 | Levin | F16H 59/044 74/473.12 |
| 2004/0084887 A1 | 5/2004 | Loh et al. | |
| 2007/0045068 A1 | 3/2007 | Namuduri et al. | |
| 2014/0152066 A1 * | 6/2014 | Hiemenz | F16F 9/535 297/344.1 |
| 2015/0247548 A1 * | 9/2015 | Battlogg | F16D 37/02 188/267.2 |
| 2015/0345134 A1 * | 12/2015 | Takahashi | F16F 9/535 52/167.2 |

FOREIGN PATENT DOCUMENTS

| | | | |
|---|---|---|---|
| DE | 202004008024 U1 | 10/2005 | |
| DE | 202004008024 U1 | 11/2005 | |
| DE | 102012017423 A1 | 3/2014 | |
| EP | E P-2159313 B1 * | 1/2013 | ............ D06F 1/02 |
| JP | 2009287639 A | 12/2009 | |
| WO | 2014013435 A1 | 1/2014 | |
| WO | 2014037105 A2 | 3/2014 | |
| WO | WO-2015033033 A1 * | 3/2015 | ........... H01H 25/065 |
| WO | WO-2016016590 A1 * | 2/2016 | ............ G06F 3/0362 |

* cited by examiner

INPUT DEVICE AND METHOD FOR OPERATING AN INPUT DEVICE

CROSS-REFERENCE TO RELATED APPLICATION

This is a continuation-in-part application of U.S. patent application Ser. No. 15/563,675, filed Nov. 22, 2017; which was a national stage application, under 35 U.S.C. § 371, of International patent application PCT/EP2016/057162, filed Mar. 31, 2016; the application also claims the priority, under 35 U.S.C. § 119, of German patent application No. 10 2015 104 927, filed Mar. 31, 2015; the prior applications are herewith incorporated by reference in their entirety.

BACKGROUND OF THE INVENTION

Field of the Invention

The present invention relates to an input device, in particular a joystick, including at least one operating device and at least one magnetorheological brake device, and with at least one control device for activating the brake device. The operating device comprises at least one supporting structure and at least one operating lever, which is accommodated on the supporting structure for pivoting around at least one pivot axis. In particular at least one sensor means for detecting the pivot angle of the operating lever is comprised.

In the prior art, joysticks tend to include a mechanical slide gate, or mechanical spring or detent systems to represent a variety of functions. In particular the joysticks of utility vehicles or off-highway vehicles such as construction machines and the like tend to include mechanical solutions with slide gates and return springs and friction brakes for the pertaining detent positions and for returning to the neutral position. A complex gear transmission and/or a Cardan shaft or the like tend to be provided for transmission of movement. Potentiometers, Hall effect sensors or encoders are employed for signal generation or position detection. In the case of desktop applications, desk joysticks have become known for indoor applications, e.g. in laboratories for controlling laboratory apparatuses, medical devices, machines or industrial robots, etc.

Joysticks with force feedback are known for use in gaming (computer games) and in other applications. These force feedback joysticks capture situations such as bumpy flooring, which are reported back to the gamer (feedback) as mechanical feedback, in the shape of jolting or light or heavy joystick handling. The prior art has often employed vibration motors, which cannot generate any torque or force increases in the operating member. Electric motors or hydraulic or pneumatic cylinders, which in the case of professional joysticks/simulators can generate operating forces exceeding 100 N (Newton) on the operating surface, for providing a highly realistic feel, are expensive, large, and complex. Given a lever distance (distance from the joystick pivot point to the user's hand) of 10 to 15 cm, this corresponds to a rotational force of 10 to 15 Nm. Generating such a high torque at high quality (little interplay, fairly silent, fast response, stepless control) requires particularly large, often very expensive actuators, which moreover require much mounting space. The mounting space is very tight in many applications.

In contrast to this, it is the object of the present invention to improve the operating quality and the scope of function of such an input device (user oriented design of the haptic feedback). The input device is preferably also intended for particularly flexible use in various fields of application. At the same time the input device should be compact in structure or require little mounting space, and should be uncomplicated and inexpensive in manufacture.

BRIEF SUMMARY OF THE INVENTION

This object is solved by an input device as claimed and by a method as claimed. Preferred specific embodiments of the invention are the subjects of the dependent claims. Further advantages and features of the present invention result from the description of the exemplary embodiments.

The input device according to the invention is in particular configured as a joystick. The input device comprises at least one operating device, and at least one magnetorheological brake device, and at least one control device for activating the brake device. The operating device comprises at least one supporting structure and at least one operating lever. The operating lever is in particular configured as a joystick lever. The operating lever is accommodated on the supporting structure for pivoting around at least one pivot axis. In particular at least one sensor means for detecting the pivot angle of the operating lever is comprised. The brake device is coupled with the at least one pivot axis, so that the control device can control and dampen at least one pivoting motion of the operating lever. The brake device is provided by, or comprises, at least one rotary damper. The rotary damper will be described in more detail below.

The input device according to the invention offers many advantages. The target-controlled damping of the operating lever offers a considerable advantage. The rotary damper is also particularly advantageous. A brake device so designed allows particularly advantageous implementation of the presently described configurations for controlled damping of the pivoting motions. This rotary damper can reliably produce the required deceleration torques, and can set them promptly and in real time if required, while it is also particularly compact and also very robust. Thus it considerably improves the operating quality. At the same time it enables a particularly compact damping, which saves mounting space and can be readily implemented.

The control device is in particular suitable and configured to activate the brake device, at least depending on at least one control command. The control device is in particular suitable and configured to convert the control command into at least one haptic signal, which is perceptible on the operating lever, preferably as a defined sequence of deceleration torques. In particular can the user thus receive, at least as a consequence of an input made and/or while making an input, a haptic feedback (so-called force feedback).

The input device according to the invention offers many advantages. The target-controlled damping of the operating lever offers a considerable advantage. Another particular advantage is the haptic feedback (so-called force feedback). This considerably improves the operating quality and at the same time, the safety of the operating processes. At the same time it enables a particularly compact damping, which saves mounting space and can be readily implemented.

In particular the pivoting motion of the operating lever is damped at least depending on the pivoting angle of the operating lever captured by sensors. The pivoting motion of the operating lever can in particular be damped by means of the brake device. For this purpose, the brake device and the control device are in particular in functional connection. The control device can in particular control the brake device. The pivoting motion of the operating lever can in particular be controlled for damping by means of the brake device and by means of the control device. The brake device can in particular be controlled by the control device, such that the pivoting motion of the operating lever is selectively, and preferably (dynamically) adjustably, damped. The control device obtains, in particular depending on at least one of the parameters described below, a target deceleration torque, and then activates the brake device such that the brake device applies a target deceleration torque for damping the pivoting motion of the operating lever.

Following an actuation, the operating lever can pivot back to an intended neutral position, preferably automatically, by means of at least one resetting unit. The control device is preferably suitable and configured to selectively damp at least one resetting motion carried out by the resetting unit, by means of the brake device. Damping the resetting motion can preferably be carried out separately for all the pivot axes provided. The resetting motion is damped in particular by adapting the deceleration torque of the brake device.

Damping the resetting motion effectively prevents the operating lever from unwanted overshooting around the neutral position. This is to ensure that the operating lever is precisely braked toward the neutral position and retracted after being released, due to the spring restoring force. In the case of conventional joysticks, the lever tends to overshoot past the neutral position, and to return after being released from a spring-biased position (e.g. end position), so that the lever needs some time to level out. This can cause problems when operating vehicles and machines and is very undesirable in gaming, since these settling motions also cause input, or control commands issued by the input device, i.e. the tool operated by the joystick performs the same settling motion. The invention or one of its configurations solves this problem while also considerably enhancing the control comfort and also reliability of operation.

The input device can particularly advantageously be employed e.g. for controlling vehicles and/or aircraft and in particular for controlling utility vehicles and preferably for controlling off-highway vehicles (these machines may also be referred to as self-moving machines) such as snow groomers, tractors, excavators, cranes, etc. The input device can be employed for controlling vehicle operation and/or other functions such as work functions.

The input device can particularly preferably also be employed in computer games or for gaming. These situations, or situations simulated by means of software, can be for example:

A stairway in a game, over which the virtual gamer must walk, may be represented by the joystick as a rippling feedback. When the virtual gamer, moved by the joystick, is standing in front of a door or wall, then the operating force increases up to the end stop (high operating force or high pivoting torque of the operating lever). When the gamer in a soccer game (e.g. FIFA) possesses the ball, actuating the joystick offers increased resistance.

In target and shooting games: Different feedbacks can be selected according to the weapon's weight or firepower. The torque characteristic of the trigger on the game controller (joystick in Y-direction) for actuating firearms changes during the game, according to the weapon selected. Jamming: blocks. Ammunition running short: operation stiffer, or rippling.

Simulator games (car races . . . ): In motor racing game or agricultural simulator: controlling the operating force (e.g. movements of the vehicle) according to the ground such as asphalt, sand, soil, etc. Peak Valley—In settings, or for acceleration, i.e. resistance. Full stop—Accident in a racing game, so as to feel the collision. Fine Ripple—For scrolling, or on asphalt. Medium Ripple—For traveling on softer ground. Hard Ripple—Traveling over meadows, hills, etc.

Help (learning mode): Preferred joystick movements (e.g. if the gamer is to move in the Y-direction only) appear easier than joystick movements/commands which are disadvantageous for a positive game progression.

Networked gaming: The haptic (force feedback) changes, depending on the other gamers respectively their input/cooperation. This allows faster and more precise controlling.

The input device may be employed in other applications. The input device can for example be employed for operating flying machines (e.g. drones), electronic devices/smart devices, televisions (e.g. as a joystick on the remote control, for navigating through the apps or transmitters and making selections), machines such as in particular machine tools and production machines, and devices and preferably medical devices or industrial robots.

Navigating a cursor in a display/indicating device is also advantageously possible. When the cursor moved by the joystick virtually rides over or past e.g. a significant location or a significant input target e.g. in a navigation application, then the joystick can briefly output a higher torque or a higher operating force (force feedback), whereby the user recognizes the situation quicker and can select more easily. Select (choose)=confirm by pressing a knob on the joystick or displace the joystick in the Z-direction (push). The haptic feedback (force feedback) can adapt, depending on the significance and also on the situation. If the vehicle requires electric energy or fuel, and the vehicle user e.g. virtually overruns with the cursor a filling station in the navigation app, which is closed at the calculated arrival time, this information is haptically passed to the user's hand by no feedback, or slight feedback (no or weak ripple).

Preferred filling stations are represented with more intensive haptic. In the case of electric vehicles the feasible operational range is calculated in real time and weighted according to the operational range (safely reachable targets: hold/stop (high torque at the joystick), critical targets due to the battery operational range: no feedback or (followed by) strong vibrations as a warning . . . ). This is also true for selecting tools on a machine tool, for "catching" a significant drawing line or a dimensioning starting point in a CAD system, or the focusing point in a camera, or flight targets for a drone, or in a game (gaming).

For controlled damping of the resetting motion it is in particular provided for a deceleration torque to be adapted to the progression of a characteristic curve of the resetting unit. The characteristic curve in particular describes a resetting torque as a function of the pivoting angle of the operating lever. The deceleration torque is in particular set in relation to the pivoting angle of the operating lever, so that the deceleration torque at the pivoting angle is the same or higher than the resetting torque at the same pivoting angle. The deceleration torque is in particular adapted to the spring characteristic of a resetting spring. For this purpose the pivoting angle of the operating lever is in particular detected by the sensor means.

The sensor means comprises in particular at least one sensor (e.g. encoder, rotary encoder, Hall sensor . . . ). The sensor is e.g. an angle sensor and in particular a rotation angle sensor. An absolute position (e.g. absolute value encoder) or a relative position can be readable. The sensor means can detect the pivoting angle of the operating lever immediately or also indirectly by way of the position of another component and in particular the brake device. For this purpose, an angular position and/or a rotation angle of the brake device is for example detected. The detected pivoting angle is preferably provided to the control device for activating the brake device.

The control device is preferably suitable and configured to automatically fix the operating lever after actuation in the current actuating position. For this purpose the control device is preferably suitable and configured for controlled setting of at least one deceleration torque, by means of the brake device, which corresponds to, or is higher than, a resetting torque of the resetting unit in the current actuating position. The advantage thereof is that after being released, the operating lever remains in any desired position and does not return to the neutral position. This function, also referred to as a smart stop, is highly advantageous for multiple operating scenarios.

The stop/deceleration torque can be set high enough so as to enable, using increased force, moving the operating lever further (overpressing). The deceleration torque may also be set high enough so that given the manual operating forces, the operating lever blocks. Shifting the operating lever further, using increased force, and/or blocking the operating lever, may take place in at least one, or in multiple, pivoting direction(s).

In all the configurations it is particularly preferred for the operating lever to be accommodated on the supporting structure about at least two pivot axes. Alternately, the operating lever may be accommodated on the supporting structure pivotable about at least three or four or more pivot axes. The operating device comprises in particular at least two or three or more pivot axes. The operating lever is in particular accommodated on the supporting structure for pivoting at least biaxially and preferably multiaxially.

At least one brake device is preferably coupled with at least one pivot axis each. The control device is preferably suitable and configured to separately damp at least part of the provided pivot axes and preferably all of the provided pivot axes, and in particular also independently of one another, in a pivoting motion of the operating lever. All the pivoting motions of the operating lever can be damped in particular separately, and preferably independently of one another. Alternately, two or more pivot axes can be equipped with one shared brake device. Then, one transmission device is in particular provided for coupling the pivot axes with the shared brake device.

It is advantageous and preferred for the control device to be suitable and configured to actuate and preferably adapt, and in particular to change and/or intentionally maintain the brake device, depending on a pivoting angle of the operating lever obtained by sensors. The control device is preferably suitable and configured to adapt the damping of the pivoting motion of the operating lever, at least depending on the pivoting angle of the operating lever detected by the sensor means. The input device comprises in particular at least one sensor means for detecting the pivoting angle of the operating lever (in particular the sensor means described above). The pivoting angle of the operating lever can in particular be detected separately for each of the pivot axes provided. For example at least one angle sensor or the like is provided for each of the pivot axes. The control device is in particular suitable and configured to set by means of the brake device, a deceleration torque for the operating lever, depending on the pivoting angle and/or the time. The control device adapts the deceleration torque, in particular taking into account the pivoting angle and/or the time, and preferably dynamically. Damping curves, which describe the deceleration torque as a function of the pivoting angle and/or the time, can in particular be set and dynamically adjusted.

It is likewise advantageous and preferable for the control device to be suitable and configured to actuate the brake device depending on at least one control command of an input receiving unit. The input receiving unit can in particular be, or is, coupled with the input device so as to establish a functional connection. The input device according to the invention can comprise at least one input receiving unit. It is also possible for the input receiving unit and the input device to be provided by an input system. Such a control command can be entered in the input receiving unit independently of an input and/or as a response (feedback) to an input performed by the input device. The deceleration torque is in particular adapted, depending on the control command. The control command can relate to at least one real operational situation (in particular an operational situation of the input receiving unit and/or the input device) and/or at least one situation simulated by means of a software.

The control device is in particular suitable and configured to receive the control command and then to modify the deceleration torque, taking into account at least the control command. The control device is in particular suitable and configured to carry out the actuations of the brake device described above and/or below, also at least partially depending on the control command. This allows to adapt the damping of the operating lever to the actual requirements of an input receiving unit, so as to always ensure optimal and particularly safe operation.

It is also preferred and advantageous that the at least one control command is provided by the input device itself. A control command provided by the input device itself is, for example, the pivoting angle captured by sensors, and/or the moving speed of the operating lever and/or a time and/or an operating mode of the input device and/or a user input lodged in the input device (e.g. selected user profile, key strokes, etc.) and/or at least one (other) parameter captured by sensors (e.g. acceleration or location of the input device). The control command may be lodged in the control device and/or be generated therein by means of lodged algorithms. The control command can be generated and/or modified by at least one user input. At least one control command from another source may also be provided. The control device may in particular receive and process several different control commands.

The control device is preferably suitable and configured to convert the control command to at least one haptic signal perceptible on the operating lever (force/moment variation), in particular so that the user can receive, due to an input, a haptic feedback (e.g. increased force to the man-machine interface). The input receiving unit can in particular selectively influence the movability or damping of the operating lever. This enables a particularly advantageous realization of haptic feedbacks (such as force feedback). The haptic signal preferably comprises at least the defined sequence of deceleration torques described in the scope of the present invention. Particularly preferably the haptic signal comprises at least the defined sequence described in the scope of the present invention, of (rapidly) changing deceleration torques or forces in the man-machine interface (also referred to as ripple/ticks/pattern). In this way, a state of the vehicle or the machine can for example be communicated.

The control device is in particular suitable and configured to block at least one pivoting motion of the operating lever in at least one pivoting direction and to enable it in at least one opposite pivoting direction. This allows to move the operating lever as required in one direction only, along the pivot axis. This unidirectional movability of the operating lever is advantageous in many situations and it may be activated and deactivated as desired with the invention. The control device is in particular suitable and configured to block the pivoting motion from the neutral position and/or from a current actuating position, unidirectionally and/or bidirectionally and/or multidirectionally. The pivoting motion of the operating lever can also be provided for directional damping.

The control device is in particular suitable and configured to change the direction in which the operating lever is blocked, and the direction in which the operating lever is enabled. The direction is in particular changed at least in relation to a situation and/or the pivoting angle and/or the time and/or the control command. The control device may preferably also block both directions, and/or enable both directions, and/or apply a continuous and/or variable deceleration torque on both directions.

The control device is preferably suitable and configured, when at least one defined pivoting angle is reached, to increase the deceleration torque by means of the brake device over at least one specific pivoting angle range, and in particular to fix the operating lever in at least one target position outside of the neutral position, after the pivoting angle range has been overcome. For this purpose the control device can set at least one selected deceleration torque, which corresponds to, or is higher than, a resetting torque of the resetting unit in the target position.

Thus, after overcoming the torque spike, the operating lever automatically remains in place when it is released (kick and hold). The target position is in particular defined by the pivoting angle of the operating lever along at least one pivot axis. The control device is preferably suitable and configured to shift the operating lever back to the neutral position beneath the defined pivoting angle.

The control device is preferably suitable and configured to dynamically determine the defined pivoting angle and/or the deceleration torque and/or the pivoting angle range and/or the target position. Determining may be dependent on the pivoting angle of the operating lever and/or the time and/or the control command. The control device is in particular suitable and configured to set, and/or cancel, and in particular to dynamically determine, the pivoting angle range and/or the target position in any desired position in the operational pivoting range of the operating lever.

The control device is preferably suitable and configured to provide the increased deceleration torque for overcoming the pivoting angle range in one pivoting direction only, so that, after overcoming the pivoting angle range, the operating lever can be returned, absent such increased deceleration torque. A brief resistance is for example generated in one direction, while the return movement to the neutral position is performed without an additional resistance (kick down). The control device in particular adapts, and in particular dynamically adapts, the increased deceleration torque and/or the direction for the increased deceleration torque, depending on the pivoting angle and/or the time and/or the control command.

In a preferred and advantageous configuration the control device is suitable and configured to fix the operating lever in at least one adjustable detent position, and preferably in multiple detent positions, which can be dynamically specified. The control device is preferably suitable and configured, by means of the brake device, to perform a controlled increase of a given deceleration torque (increase by a defined factor), so as to prohibit any further movement or resetting (by hand and/or by means of the resetting unit), without applying additional force and/or without any additional user action. The control device is in particular suitable and configured to dynamically set, and preferably to specify, the detent position, depending on the pivoting angle and/or the time and/or the control command.

This configuration offers many advantages and allows, for example, the simulation of a selector lever of an automatic motor vehicle transmission (P R N D). Moreover the input device can be employed in a very large number of different devices and machines respectively vehicles, without requiring any structural modifications. The user receives an individual, adapted feedback, corresponding to the application purpose. This increases the operating comfort and reduces operating errors. The detent positions allow particularly intuitive and precise input.

An arbitrary quantity of detent positions, which the brake device can displace, is in particular adjustable in arbitrary positions in the operational pivoting range of the pivoting lever. The detent positions are adjustable in particular depending on the pivoting angle and/or the time and/or the control command. The detent positions are in particular defined at least by a pivoting angle and a deceleration torque. The user action comprises in particular at least one actuation of at least one switching element. Pressing a key on the operating lever is provided, for example.

The control device is in particular suitable and configured to increase the deceleration torque, already starting at a defined pivoting angle prior to reaching a detent position, and/or to decrease it, starting at a defined pivoting angle after leaving the detent position. Increasing and/or decreasing may be carried out continuously or variably.

In a particularly advantageous configuration the control device is suitable and configured to block the operating lever as it reaches at least one specified pivoting angle and/or in the neutral position and/or in a currently held position, such that a manual force to be applied operationally cannot cause any further movement in at least one pivoting direction and/or in all the operational pivoting directions. For such blocking, the control device increases in particular the given deceleration torque by a defined factor. This enables a particular good simulation of mechanical stops. One advantage over conventional, mechanical damping is, that no stick slip effect will occur, and no initial stick friction must be overcome. Such blocking may also be provided in at least one of the detent positions described above.

It is possible to provide, prior to reaching the defined pivoting angle, a free and/or weaker damped movement of the operating lever, so as to enable automatic return to the zero position from there.

It is possible for the control device to block the pivoting motion of the operating lever for all the pivot axes and for all the pivoting directions such that the manual force applied operationally does not allow any further movement. This operating mode (axis locked) allows reliable and safe locking of the input device as required, or depending on the situation (situation dependent feedback). Blocking is also possible in one pivoting direction only and/or for selected pivot axes only. The pivoting direction and/or the pivot axis is/are selected, for example, due to a control command or a user action or the near field recognition. For example when a container in a container aisle of a container port (there are further containers to the left and right of the container aisle) is moved forwards or rearwards (X-axis) by means of the joystick, then the lateral axis of motion (Y) may be blocked or be made hard-going, which prevents or prohibits collision. Near field recognition systems (motion sensors, camera systems, GPS, radar systems . . . ) sense the situation, a computer analyzes the data, which it lets flow into conceivable or useful motion patterns of the joystick in real time.

The control device can preferably modify the deceleration torque, taking into account the motion speed of the operating lever, in particular the angular velocity of a gear transmission and/or the brake device. The control device is in particular suitable and configured to compensate, at least approximately, a structural, speed-dependent deceleration torque of the brake device, to enable a uniform deceleration torque across various speeds.

It is preferred for the control device to be suitable and configured to simulate at least one slide gate mechanism, by a combination of a plurality of detent positions, and at least one zero position, and/or at least one target position, and/or a plurality of blockings of the operating lever dependent on the pivoting angle. For example, a slide gate mechanism of a mechanical gear transmission of a motor vehicle and for example an H-shifting can be simulated. For this purpose the input device comprises in particular at least two pivot axes (X- and Y-axes). Multiple brake devices are in particular coupled with a pertaining pivot axis each, to generate a slide gate-like movement of the operating lever, controlled by the control device.

In particular at least one control algorithm for simulating at least one slide gate mechanism is lodged in the control device. The control device in particular selects a specific slide gate mechanism, dependent on a user input and/or on the control command of the input receiving unit, which it simulates. When the input device is installed in a utility vehicle, different slide gate mechanisms can for example be simulated, for a gear transmission, or for operating a work function. Thus, a joystick can perform multiple functions.

In a particularly advantageous configuration, the control device is suitable and configured, to decelerate and to enable the pivoting motion of the operating lever in a controlled sequence, by means of the brake device. In order to realize such a sequence, the control device is in particular suitable and configured to set various levels of deceleration torques for the deceleration and enabling. Such a sequence offers a reliably perceptible, haptic feedback, including in difficult operating conditions, and it can be particularly readily employed with the invention.

The sequence is in particular composed of a sequence of relative maxima with a higher deceleration torque, and relative minima with a lower deceleration torque. The angular distance of a period of adjacent, relative maxima is in particular settable, and it is set. The progression of the deceleration torque is in particular set over a period, depending on the operating mode set. Such a sequence showing particularly short intervals may also be referred to as ripples/ticks. Such a sequence is in particular configured from a defined combination of deceleration torques as functions of the time and/or of the angle. The deceleration torques for deceleration and/or enabling are preferably set as a function of the time and/or as a function of the pivoting angle and/or depending on a control command. Such a sequence can in particular be set in dependence on the pivoting direction, and for example in one pivoting direction only, or alternately in both pivoting directions.

Such a sequence may also be provided for damping the resetting motion. Then the resetting motion after releasing the operating lever is damped, for example, so that the operating lever is returned to the neutral position with a ripple.

The deceleration torques of the sequence are started and/or maintained and/or terminated, in particular dependent on the angle and/or dependent on the time. Preferably, these dependencies may be provided for changing within a sequence. For example the sequence is started dependent on the angle or dependent on the time, and the length of the sequence is then set dependent on the time or dependent on the angle respectively.

The control device is preferably suitable and configured to start the deceleration torques of the sequence dependent on the time, and to maintain them, dependent on the angle. The control device is in particular suitable and configured to omit setting a deceleration torque provided in the sequence, if an angular position provided for the start (specific pivoting angle of the operating lever) is overrun, while a deceleration torque is being maintained.

The control device is particularly preferably suitable and configured to set the different deceleration torques of the sequence to a controlled frequency and preferably set to such a frequency that the pivoting motion of the operating lever is damped by way of controlled vibrations. The frequency is in particular at least 20 Hz and preferably at least 50 Hz.

The control device is in particular suitable and configured for dynamic adjustment of the different deceleration torques of the sequence over the time and/or the pivoting angle and/or the motion speed (angular velocity) of the operating lever and/or the quantity of previously performed settings of deceleration torques. These parameters may also be provided by way of control commands. For example, this allows haptic signals of an approach to an end position or detent position. The user can thus be warned e.g. if he pivots the operating lever so as to set the vehicle to an operating state which requires particular attention (movement of the tool or the load in spatially restricted areas; risk of collision . . . ).

The control device can dynamically adjust the different deceleration torques of the sequence, including depending on the control command of the input receiving unit and/or of the input device. The control command allows, for example, to indicate to the input device that a maximum speed is reached, or a crane boom is overstressed, so that the user then perceives a vibration of the operating lever.

The maximum bearing load of a crane boom is, for example, dependent on the traversing position. Loads moved further outwardly on the boom must be lower than they can be in the vicinity of the center of the crane. Near field recognition-measuring systems can sense and analyze the situation and can thus inform the operator, by haptics about force variations in the operating member, that he moves in the "green" range (permissible, uncritical), "amber" range (it might turn critical) or red range (overload—the load is too far outwardly on the boom). The operator can then decide, on the basis of haptic feedback in the operating member, how to proceed further. He receives this significant feedback without having to move his eyes away from the process, thus he does not need to watch a display on the control desk, which is highly advantageous.

The control device is in particular suitable and configured to set a sequence including controlled variations of deceleration torques. For this purpose a sinusoidal or cosinusoidal path is in particular provided. For this purpose the path shows in particular a (slight) offset in the negative range. The offset is in particular less than 30% and in particular less than 20% and preferably less than 10%. At least two zero crossings per period are in particular provided for the progression. The brake device is in particular controlled by way of a sine signal or cosine signal, in particular showing a predetermined and in particular adjustable (slight) offset from the zero point. Particularly preferably such a sequence shows a progression which corresponds to the spring characteristics of a mechanical spring. Thus, a mechanical joystick can be simulated particularly realistically.

It is possible and preferred that the control device is suitable and configured, when the operating lever is actuated after a defined time of the operating lever not being actuated, to emit at least one haptic warning signal, and for this purpose to preferably set a defined sequence of deceleration torques. The sequence is configured in particular as described above. It is also possible and preferred that, after a defined time when the operating lever is not operated, the operating lever is damped and/or blocked at an increased level, in at least one pivoting direction and/or in relation to at least one pivot axis, as described above. This allows to effectively counteract an inadvertent actuation.

It is preferred that the control device is suitable and configured to actuate the brake device at a regulating frequency of at least 5 kHz and preferably at least 10 kHz and particularly preferably at least 50 kHz. The brake device is in particular suitable and configured to implement such a regulating frequency.

The control device is in particular suitable and configured to damp the brake device in real time. The brake device is in particular suitable and configured to implement the deceleration torque in real time. The damping is in particular adjustable in dependence by means of the control device of the brake device in real time, to the pivoting angle and/or the time and/or to a control command and/or to a motion speed respectively angular velocity of the operating lever. The brake device is in particular suitable and configured to change the deceleration torque, within less than 100 milliseconds, by at least 30%. The deceleration torque is in particular variable within less than 10 milliseconds by at least 10%, preferably by at least 30% and particularly preferably by at least 50%. The deceleration torque may also be variable within less than 100 milliseconds by at least 100% or 500% or by ten times or a thousand times the amount.

The magnetorheological brake device is preferably suitable and configured to provide, in particular by means of a sensor, rotary encoder, or incremental encoder, at least 30,000 increments, in particular 30,000 increments/revolution, for one pivot axis of the operating lever. Incremental encoders provide, for example, a specific quantity of impulses per revolution, or a so-called zero pulse per revolution. These may be incremental encoders using UV/VIS signals or absolute shaft encoders). This provides particularly effective implementation of haptic signals. The increments can in particular be employed to provide the detent positions and/or the sequences described above. In particular at least 30,000 increments per revolution of the brake device and/or the transmission stage can be provided. The sensor means can in particular comprise at least 30,000 increments per revolution of the brake device.

The brake device is preferably coupled with the at least one pivot axis via at least one transmission stage. The transmission stage preferably shows at least one gear ratio between 2:1 and 5:1. Other gear ratios are likewise conceivable.

The transmission stage comprises in particular at least one belt drive. The belt drive in particular couples the pivot axis with a rotation axis of the brake device. The belt drive comprises in particular at least two belt pulleys and at least one belt. Other types of transmission stages are likewise conceivable. For example, the transmission stage may include a gear transmission and/or lever mechanism or the like. The pivot axes are in particular coupled with one rotation axis of the brake device each.

The applicant reserves the right to claim an input system, which comprises at least one input device according to the invention, and at least one input receiving unit in functional connection with the input device. The input receiving unit is preferably configured as a utility vehicle, so that the input device can at least partially operate the functions of the utility vehicle. It is also preferred that the input receiving unit is configured as a computer, and that the computer is in particular equipped with a simulation program and/or a gaming program. A computer is for example understood to include: computer, control device, processor, which processes data by means of programmable rules for computing, etc. The functions of the simulation program and/or the gaming program can in particular be operated by the input device, at least partially.

The utility vehicle is preferably configured as an off-highway vehicle. Such a utility vehicle can also be referred to as a self-propelled work machine. The utility vehicle is in particular an agricultural or forestry utility vehicle. Other types of utility vehicles are conceivable. The utility vehicle can, for example, be an agricultural tractor, a harvester, excavator, crane, or the like. The utility vehicle may also be a drone or other aircraft.

The input system also offers a particularly advantageous solution to the object introduced above. The input device and the input receiving unit are preferably configured as has been described above for the input system according to the invention.

The method according to the invention serves to operate an input device and in particular a joystick. At least one operating lever of the input device is pivoted, at least partially manually, about at least one pivot axis, to perform an input into an input receiving unit, which is in functional connection with the input device. At least one pivoting motion of the operating lever can be selectively damped (and enabled) by means of at least one magnetorheological brake device coupled with the pivot axis. The brake device is selected by means of at least one control device, at least depending on the pivoting angle and/or the motion speed of the operating lever (in particular sensed by means of at least one sensor means), and/or on the time and/or at least one operating state of the input receiving unit, to perform controlled modification of the damping.

The method according to the invention also offers many advantages. The method is preferably designed so that the input device and/or input system described above can be operated using the same. The input device and/or the input system according to the invention are in particular suitable and configured to be operated using the method according to the invention.

The operating state of the input receiving unit preferably relates to at least one of the following parameters: power status, speed, acceleration, position in space, ambience, ground traveled, work performed, selected user profile, selected operating mode, activities of an assistance system and in particular operating assistance system, software-simulated situation, input conditions for operating a program (menu items, choice options, fields, etc.).

The damping or blocking of the operating lever pivotability is preferably selectively increased in case of an operating state showing disturbances above a threshold value (for example, due to rough ground or vibrations caused by the work) and/or endangerment (for example, high speed), and/or if an assistance system actively intervenes in using the input receiving unit. In order to detect these operating states, the input receiving unit preferably includes at least one suitable sensor means and for example an acceleration sensor or the like.

The operating lever is in particular provided with at least one actuating member. The actuating member is in particular configured as an automatically resetting operating knob or operating key. At least one operating switch may be provided additionally or alternately. It may be employed for user input, which is effective on the damping of the pivoting motion of the operating lever. It may for example be used for cancelling controlled blocking of the pivoting motion.

An operating state showing a parameter above a threshold value and/or a danger above a threshold value and/or involving intervention by an assistance system, is preferably signaled by haptics by means of a controlled sequence of different deceleration torques during a pivoting motion of the operating lever. Such a sequence is preferably configured as described above for the input device according to the invention. This enables effective and secure counteraction to maloperation of the input receiving unit. It is also possible to provide for weaker damping, or enabling, of the pivoting motion of the operating lever when the parameter and/or the endangerment fall back below the threshold value.

It is advantageous and particularly preferable for the pivotability (pivoting motion) of the operating lever to be damped and/or blocked more intensely, variably but controlled, depending on at least one situation. It is preferably provided for the pivoting motion of the operating lever to be variably modified, depending on at least one real operational situation (in particular an operational situation of the input receiving unit and/or of the input device) and/or at least one software-simulated situation, so as to result in a controlled increase or decrease, or even blocking, of the damping.

In configurations including a damping depending on the pivoting angle and/or the motion speed of the operating lever, the pivoting angle respectively the motion speed of the operating lever is in particular detected by means of at least one sensor means.

In the scope of this invention the described designs for controlled damping of the pivoting motion can preferably be performed separately for all, or at least part, of the provided pivot axes and/or pivoting directions. The pivoting motion of the operating lever around a pivot axis can in particular be damped independently of the pivoting motion of the operating lever around at least one other pivot axis. The directions of the pivoting motions of the operating lever can in particular be damped separately, and preferably also independently of one another. The forward movement can in particular be damped separately, and preferably independently of a reverse movement.

In the scope of this invention the terms damp and decelerate are preferably used as synonyms. The control device is in particular suitable and configured for controlled deceleration and enabling of the at least one pivoting motion and the resetting motion, and to block, given the operationally expected manual forces at the operating lever. The pivoting motion may also comprise, or be configured as, a rotary motion. Manual forces of at least 100 N can in particular be generated on the operating lever. In the scope of this invention all the suitable deceleration torques can preferably also be employed as holding torques for holding the operating lever in place, and be adapted according to the invention.

Damping the pivoting motion takes place in particular by adapting the deceleration torque of the brake device. The control device is in particular suitable and configured to adapt the deceleration torque of the brake device, for controlled damping of the pivoting motion. The control device is in particular suitable and configured to dynamically set the deceleration torque.

The control device can preferably set an arbitrary deceleration torque, which the brake device can generate, for an arbitrary pivoting angle, which the operating lever can reach and/or for an adjustable duration. The control device comprises in particular a multitude of adjustable operating modes, and it is preferably suitable and configured to carry out assignment of deceleration torque and pivoting angle and/or duration, depending on the operating mode.

The control device is in particular an electronic control device. The control device comprises in particular at least one control algorithm. The deceleration torque is in particular set by activating an electric coil device of the brake device, at a specific current and/or a specific voltage or a suitable signal.

The deceleration torque is in particular adapted as a function of the pivoting angle and/or the time and/or the motion speed (in particular angular velocity) of the operating lever and/or the control command of the input receiving unit. The pivoting motion is in particular damped, dependent on the angle and/or dependent on the time and/or dynamically. The control device is in particular suitable and configured to damp the pivoting motion at a deceleration torque that is continuous or variable, and in particular dynamically adapted over the time and/or the pivoting angle.

In the scope of this invention, enabling the pivoting motion is in particular understood to mean that only an operational base momentum of the brake device is given, without any additionally imposed magnetorheological deceleration, such as by energizing a coil device of the brake device. When the pivoting motion is enabled, the magnetorheological brake device is in particular inactive, so that no field is generated for actively influencing the magnetorheological medium of the brake device.

The embodiments described in the scope of this invention can in particular be employed for damping the resetting motion, in analogy to damping the pivoting motion. In all the configurations it is preferred for the control device to set the neutral position. The neutral position may be fixedly specified.

The input device according to the invention is equipped with at least one rotary damper, which will be described in detail below. At least one rotary damper each is preferably assigned to the pivot axes.

The prior art has disclosed a great variety of dampers for damping relative motions. Translational dampers tend to be employed in which a piston connected with a piston rod subdivides a cylindrical damper chamber into a first chamber and a second chamber. The damping medium flows through a damping duct at or in the damping duct from one of the sides of the damper piston to the other of the sides as a translational relative motion occurs which is being damped.

Translational dampers are suitable for multiple purposes such as for a shock absorber in bicycles or motor vehicles or for damping other shocks. The drawback of these translational dampers is that a considerable amount of damping medium needs to be used since the damping medium must be present other than in the damping duct, also on both sides of the damper piston. Moreover this structure results in a considerable hydraulic basic damping in the flow duct in dependence on the flow rate.

There is increasing desire for inexpensive, controlled dampers allowing to vary the degree of damping during operation for example electrically by means of a control device. The use of magnetorheological mediums and in particular fluids has been tried and tested for damper systems showing particularly fast responses and thus allowing to achieve changes of the damping strength within a few milliseconds. Magnetorheological fluids are comparatively expensive though so that their use is difficult or uneconomic for many applications. It may for example be useful to provide an accelerator pedal or brake pedal in a motor vehicle or a truck with a damper to obtain damped resetting of the pedal concerned. Moreover, damped movement provides enhanced feedback to the driver of such a vehicle. The budget for damping these motor vehicle components is considerably lower than for damping the wheels or the motor vehicle overall. This is why these translational dampers are not suitable for low-cost damper applications.

Devices have been disclosed for clutches and brakes provided for rotative operation. A gap, for example cylindrical, is provided with external and internal wedge laminations for subdividing the cylindrical gap into a number of partial gaps and transmitting the required forces. The drawback is the high structural complexity and the amount of magnetorheological fluid used, which increases costs.

WO 2014/037 105 A2 discloses a transmission apparatus using only a minimal amount of magnetorheological medium although the damper operation is translational. This is achieved by way of sealing the axial ends of the damping gap so that the magnetorheological medium remains in the damping gap as a kind of friction lining. Although this transmission apparatus is generally functional, it shows the drawback of a comparatively high basic force applied, which first needs to be overcome before damping is possible.

The rotary damper serves for damping the pivoting motion of the operating lever. "Damping" may also be understood to mean a haptic feedback ensuing from damping, i.e. a return signal of force/momentum to the user. The rotary damper comprises in particular two components, one of the components comprising an inside component and the other component, an outside component. It is preferred that the outside component radially surrounds the inside component at least in sections. Between the components a damping gap is preferably disposed that is bordered radially inwardly by the inside component and radially outwardly, by the outside component, and which is at least partially and in particular at least nearly entirely filled with a magnetorheological medium. The damping gap can preferably be exposed to a magnetic field to damp a pivoting motion between the two contrapivoting components around an axle. The damping gap is preferably annular and circumferential in configuration. At least one of the components is preferably provided with a plurality of at least partially radially extending arms. At least some of the arms are preferably equipped with an electric coil having at least one winding each. The winding and in particular each winding extends preferably completely adjacent to the axle and spaced apart from the axle.

This rotary damper has many advantages. A considerable advantage of the rotary damper presently described is a pivoting motion that is employed for damping. This allows to dispense with sealing the components movable relative to one another during a translational relative motion toward one another. It is sufficient to provide between the two components for example a circumferential seal which does not need to move during the relative motion. This achieves a base momentum or base force that is much lower than in translational movement where for example a seal ring must be displaced on an axle while the two components are axially displaced relative to one another.

Providing a plurality of radially extending arms, each provided with an electric coil having at least one winding each, allows to apply an optimal magnetic field on the damping gap between the inside component and the outside component. The available surface and the volume of the damping gap are utilized optimally so that a narrow and in particular circumferential damping gap suffices for transmitting high damping forces. A suitable magnetic field is applied for damping. Preferably the magnetic field acts on at least 25% of a surface of the annular, circumferential damping gap. The magnetic field influences a surface fraction of the entire peripheral surface of the annular circumferential damping gap that is in particular more than 30% and preferably more than 40% and particularly preferably more than 50%, 60%, 70% or 80% of the peripheral surface of the annular circumferential damping gap. In the sense of the present application a surface portion will count as the surface fraction influenced by the magnetic field if its magnetic field strength is more than 5% larger and preferably more than 10% larger than a magnetic field strength acting on average on the peripheral surface (of the annular, circumferential damping gap).

The rotary damper generates in particular a controlled damper momentum. The damper momentum is preferably directly used for damping a rotary or pivoting motion or for generating a haptic feedback (force characteristic curve; rattling; rippling; virtual stops, force peaks . . . ). The damper momentum may be transformed into a damper force by way of other means serving e.g. for damping the movement of another component. In this respect the rotary damper provides a damper momentum which may be transformed into a damper force acting on another component. The damper momentum and the damper force, which may optionally effectively act on another component, are interdependent on one another, in particular proportionally and in many cases linearly or approximately linearly, and—to the extent as it is technically useful—may be used as synonyms in the sense of the present application. At any rate a damper momentum is provided which may be transformed into a corresponding damper force. An effectively acting damper force may also be referred to as a damping force.

The damping gap preferably extends in the axial direction between a first end and a second end and in particular entirely inside the outside component. The damping is preferably performed by way of shearing forces or shear stresses in the magnetorheological medium. The magnetorheological medium remains in the damping gap as a kind of controlled friction lining. The required volume of the magnetorheological medium is minimal and substantially ensues from the volume of the preferably cylindrical damping gap.

In a preferred specific embodiment the two components are pivotable relative to one another only by a limited pivoting angle. The pivoting angle may be limited by way of various measures. A mechanical stop preventing excess pivoting is preferred.

Alternately it is possible to provide for kinematic limiting of the pivoting angle, wherein the maximum pivoting angle follows from the connected components or devices. For example if the rotary damper presently described is used in a device such as a prosthesis, then the components connected with the rotary damper directly limit the feasible pivoting angle. A similar effect occurs when a rotary damper, as presently described, is used for example in an accelerator pedal, clutch pedal or brake pedal of a motor vehicle. In these cases the structural conditions of the pivoting angles are again limited naturally or by the mounting space.

Alternately it is possible to limit the pivoting angle by the cables or connecting lines to the electric coil. It is possible to have the connecting lines extending one-piece from the outside up to the one or more electric coil(s) for example if a slip ring is dispensed with.

Preferably no slip ring is provided for connecting the electric coils and optionally sensors. Particularly preferably the electric coils and optionally sensors and thus the components for transmitting electric power or signals are connected from the outside through a coil spring such as a long, coiled flat ribbon cable or single-material and in particular one-piece connecting lines without any counterrotating components.

Other configurations having e.g. less strict service life requirements may also provide for a wearing slip ring to ensure contact transmission of the electric connecting lines to the electric coils.

In a preferred specific embodiment the damping gap is formed by a chamber respectively forms part of a chamber. Then the chamber is sealed by the two components and by a sealing device disposed between the two components, or alternately by two sealing devices disposed between the two components. It is also possible to provide three or more sealing devices.

It is particularly preferred for one single sealing device to completely seal the chamber to the outside. This sealing device is provided at a gap between the two components. For example the rotary damper may show a kind of pot or barrel structure with a pivot shaft protruding outwardly from the pot structure. Then the inside component is entirely surrounded by the outside component so that only the pivot shaft of the inside component protrudes outwardly.

Alternately it is possible for the axial ends of the damping gap to be provided with a substantially tight magnetic sealing, which by way of a magnetic field acting in a narrow gap between the two components interlinks the magnetorheological particles present, so as to ensure an at least substantially reliable sealing of the damping gap. A further seal or sealing device may be provided at the housing exit. The housing is preferably formed by the component on which the outside component is configured.

A sealing device in the sense of the present invention prevents in particular unintended mass transfer between spaces. The sealing device may comprise one or more sealing members. Such a sealing device may for example comprise, or be formed by, an O-ring or an X-ring.

In a preferred specific embodiment the chamber is radially disposed between the first component and the second component over its axial length. The chamber is in particular disposed entirely between the first and second components. The chamber may comprise, other than the damping gap, at least one reservoir to store a small and in particular minimal supply of the magnetorheological medium. A maximum reservoir volume is preferably smaller than the damping gap volume and in particular smaller than half the damping gap volume. A reservoir allows to compensate for a certain loss of magnetorheological medium over time without too much increasing the total amount of the magnetorheological damping medium filled in during manufacture.

The reservoir may also be provided with a gas volume in an elastic element configuration to provide slight excess pressure in the magnetorheological medium so as to enable (pressure) compensation e.g. in the case of temperature fluctuations. Moreover the function is ensured, loss of minimal fractions of damping medium notwithstanding. An outside reservoir connected through a line with or without a spring or an air volume or the like is likewise possible.

The radial height of the damping gap is preferably less than 2% of a diameter of the damping gap. A diameter of the damping gap may be understood to mean both the inner diameter and the outer diameter. Preferably the outer diameter of the damping gap is considered as the diameter.

Given an outer diameter of 30 mm the (maximum) radial height will be approximately 0.6 mm. Given an outer diameter of 10 mm the radial height of the damping gap will be 0.2 mm.

Particularly preferably a radial height of the damping gap is less than 1 mm and in particular less than 0.5 mm. In advantageous configurations the radial height is <0.3 mm.

Particularly preferably a radial height of the damping gap is more than 0.1 mm and in particular >0.15 mm and it may also be more than or equal to 0.2 mm. If the radial dimensions are provided still smaller, this requires observing certain tolerances, which would increase the costs for the rotary damper. This is only worthwhile in specific applications.

In advantageous configurations the volume of the damping gap and/or the chamber is less than 10 ml. Preferably the volume of the damping gap and/or the chamber is <5 ml and particularly preferably less than 3 ml. Volumes of 2 ml and less are likewise possible and preferred.

In all the configurations it is preferred for the inside component to show the electric coils disposed at the radially extending arms. Alternately it is possible for the radially extending arms to protrude radially inwardly from the outside component. It is also preferred for both the inside component and the outside component to show radially extending arms, with the radially extending arms then preferably protruding outwardly from the inside component, and inwardly from the outside component.

The damper momentum can be varied in particular within less than 20 ms by at least 30% of the required and/or feasible operating range. In all the configurations a control device is preferably assigned to, and/or comprised in, the rotary damper. The control device for the rotary damper is preferably provided by the control device of the input device. Alternately, the rotary damper may comprise its own control device, which is in functional connection with the control device of the input device.

The electric coils and optionally sensors are connected through electric connecting lines which are in particular routed outwardly inside or outside the inside component. For example the connecting lines may be routed outwardly through the inside component and through the pivot shaft therein, one-piece or single-material, without a slip ring. Alternately it is possible for the connecting lines to be routed through and outwardly outside of the pivot shaft. Particularly preferably the electric coils and optionally sensors and thus the components for transmitting electric power or signals are connected from the outside through a coil spring such as a long, coiled flat ribbon cable or single-material and in particular one-piece connecting lines without any counterrotating components.

Other configurations having e.g. less strict service life requirements may also provide for installing a wearing slip ring or the like.

Preferably the magnetic field generating devices show opposite poles at the adjacent ends of adjacent arms of at least one component. Particularly preferably an even number of arms is used. Preferably at least 4 arms are provided. Preferably, 6, 8, 10, 12, 14 or 16 arms are employed. The number of arms may depend on the size of the rotary damper and may be higher still.

The outside component is preferably part of a housing accommodating the inside component. A pivot shaft of the inside component is preferably routed outwardly from the outside component.

It is preferred for one of the pivot shaft ends to be routed out of the housing and for the other of the pivot shaft ends to terminate within the housing. This configuration requires to provide one seal or sealing device only for sealing the housing to the outside. The pivot shaft may be supported within the housing on one or two bearings or the like so as to enable low-friction rotation. The bearing may be a low-cost sliding bearing or alternately, in the case of very high requirements on the base friction and service life, it may be a ball bearing or roller bearing. In the case of minimal requirements it may be dispensed with.

It is also possible for the pivot shaft to be routed outwardly through the housing on both sides, so as to guide the first end of the pivot shaft out of the housing on one side, and on the other side, the other end of the pivot shaft protrudes outwardly from the housing. This configuration allows a symmetric accommodation of the rotary damper which may prove advantageous for the rotational force transfer.

In all the specific embodiments it is possible to also mount on the pivot shaft a toothed wheel, which is then in functional connection, or meshing with, a toothed rack or other gear wheels.

In all the configurations at least one suspension device is preferably provided for building up a counterforce as the two components deflect in at least one pivoting direction.

Such a suspension device is advantageous since it allows to bias the rotary damper to a base position. The suspension device may be provided both at the rotary damper or inside the housing of the rotary damper. Alternately it is possible for the suspension device to act on the outside of the rotary damper, or to be provided as a separate component, which is an element of a device employing the rotary damper. This includes, but is not limited to, linear springs, leg springs, coil springs, flat springs, torsion springs, helical tension springs or compression springs.

In all the configurations it is possible to provide a multitude of damping gaps distributed over the circumference of the component. Separating elements may for example be provided in the annular space in which the one or more damping gap(s) is/are configured. These separating elements may for example protrude outwardly from the inside component, or protrude inwardly from the outside component. These separating elements extending in the axial direction or helically subdivide the annular space into multiple damping gaps. Since the separating elements then transmit a force, the separating elements ought to be fixedly connected either with the inside component or the outside component.

In advantageous configurations a permanent magnet is assigned to at least one electric coil. This means that the magnetic field generating devices comprise, other than an electric coil, also at least one permanent magnet. The magnetic field of the permanent magnet may be influenced by way of the assigned electric coil. The magnetic field of the permanent magnet may in particular be continuously varied and/or permanently changed by way of short pulses of the electric coil. Continuously varying the magnetic field of the permanent magnet allows a temporally continuous and infinite adjusting of the acting magnetic field. For example the effectively acting magnetic field may be reduced to nearly 0, or to 0, or the magnetic field polarity may be reversed.

These measures allow to set a specific magnetic field and thus a specific basic damping which acts permanently, independently of any power supply. In preferred specific embodiments the length of the damping gap is larger than its diameter.

In all the configurations it is possible and preferred for the magnetorheological medium to contain a suspension of ferromagnetic particles in a medium such as oil, glycol or grease and/or wherein the medium contains stabilizers.

Preferred specific embodiments of the rotary damper presently described may be provided for a car door, a brake pedal, clutch pedal, or accelerator pedal. Use in a prosthesis, an exoskeleton, a piece of furniture, fitness apparatus, or a bicycle is also possible. Operation may be carried out by way of an operating or control lever.

Therefore we also claim an apparatus configured as a training apparatus or fitness apparatus having at least one rotary damper, as it is described herein. In the scope of the present invention a training apparatus is in particular also understood to mean a fitness apparatus and vice versa. The training apparatus is suitable and configured for controlled muscular activities. It comprises at least one at least partially muscular energy-actuated operating member. At least one operating member movement can be damped by the rotary damper.

In a feasible variant a customer enters e.g. a fitness center and goes to a body scanner and/or an analyzer. The analyzer determines and stores the "leverage ratios" (e.g. upper arm, forearm, thighs, body height . . . ). The customer receives a device (e.g. NFC bracelet, chip, a smart device such as a smartphone or smart watch or the like) which transmits this data to the fitness apparatus during use. Thus it will always show optimal settings for training (e.g. force over travel; momentum over angle, or the like) or advises the user on adjustments (e.g. adjust the seat mechanically or the like) or the device self-adjusts (e.g. by means of electric motors or the like).

In another conceivable variant the customer carries the data on his person (e.g. by way of a smart watch, smartphone, chip or the like). He can thus immediately start in any fitness center (worldwide) which can process this data or has suitable fitness apparatus (user retention).

Both of these or other variants transmit the data further from the fitness apparatus to a "memory", analyzing it (e.g. cloud, internal memory or the like). The customer can then process the data e.g. at home.

The data preferably causes refining of the user profile (e.g. a learning configuration may be provided). The data may also be compared against those of colleagues and optimized (e.g. by way of a community, cloud or the like). Preferably a log file is created displaying the course and success of the training. Alternately the data may be transmitted to a diagnostic center, doctor, coach or health insurance agency, for them to verify what had been done and how.

Preferably at least one control device is provided, and suitable and configured for controlled adjustment, taking into account at least one predetermined parameter of the damper. Adjusting is preferably performed in real time. For example the force desired for a muscle exercise may be provided as a parameter. The damper is then adjusted so that the user must apply the force for moving the operating member.

Preferably the control device is suitable and configured to register at least one characteristic quantity of the movement of the operating member. The control device is in particular suitable and configured for controlled setting of the damping of the rotary damper, taking into account the parameter in dependence on the characteristic quantity.

The characteristic quantity of the operating member movement is in particular captured by at least one sensor. Capturing takes place in particular continuously. For example by means of one of the sensors presently described and preferably by the rotary encoder. Then the parameter preferably relates to a threshold value and/or a comparison operation for the characteristic quantity. Alternately, a predetermined parameter and captured characteristic quantity may be assigned by way of an electronic map.

Such a sensor for the rotary damper is preferably provided by the sensor means of the input device. Alternately, the rotary damper may comprise its own sensor, which is in functional connection in particular with the sensor means and/or with the control device of the input device.

The coach may for example specify a parameter such as a value for the force/rotational force desired in an exercise. Then the force/rotational force applied by the user is captured as the characteristic quantity of movement of the operating member and compared against the specified value. When the user exceeds the value, the damper settings may be adjusted weaker or movable more easily. This effectively prevents overstressing the muscle in training. This is an advantage in particular in rehabilitation measures where overstressing must needs be avoided. Alternatively the damper may output a haptic feedback to the user. As overstressing is registered, the damper may be switched to zero or to a very low force.

Preferably the characteristic quantity describes an angular position and/or a direction of movement and/or a rotational force of movement and/or acceleration of the operating member. These characteristic quantities are particularly advantageous since they are characteristic of the user's muscular activities at the training apparatus.

The damper is particularly preferably adjusted as a function of the characteristic quantity. The damper is in particular adjusted dynamically and/or adaptively. This shows the advantage of allowing a much higher degree of customized training than has been possible with weight pulls or conventional linear damper settings. Thus, training movement may start using slight force and may increase in weight with increasing stroke length and/or angle of rotation. The force applied may be set in real time in dependence on an acceleration registered as a characteristic quantity. Differentiating between the left and right sides of the body and adapting correspondingly is also possible.

Alternately the training program can be varied a number of times and individually during the training period.

The characteristic quantity may for example describe the angle of rotation in straightening the knees. Then the damper and thus the required muscular energy may be set in dependence on the angle of rotation. The force for example decreases as the knee straightens progressively. This prevents harmful training stresses. The damper may be set to zero force for a critical angle of rotation so as to prevent harmful overstretching.

Critical angles or positions may be predetermined, based on injuries or due to physiological conditions. The damper can be preset precisely to these conditions (personalized training).

Since some people tend to perform exercises too hasty and too fast, which puts increased or even harmful stress on joints and muscles, the damper may be adjusted or it self-adjusts automatically in these situations so as to disable or prohibit fast displacement/movement. Then the damper may be set very soft, or it may output a haptic feedback.

Alternately it is possible for the characteristic quantity to describe the direction of movement. This allows to set different forces e.g. for straightening the knees and for the reverse movement, bending the knees. For many muscle exercises it tends to be highly decisive that the return movement be performed using a force that is lower, alternately larger, than in the forward movement.

During training a haptic feedback may be output to the user. This is in particular done by controlled changes to the damping characteristics and preferably as described above. The feedback is in particular output in dependence on the characteristic quantity of the movement. For example the damper may be set to issue a haptic rattling or juddering if the characteristic quantity shows that the user performs an exercise too fast or too forceful. The feedback may also be output if the user exceeds an angle of rotation or a distance of movement or if he performs a flawed movement sequence. Thus the user may learn the correct performance of the exercises in an easy and simple way.

It is also possible to output the feedback, taking into account other sensor values serving as a characteristic quantity. The control device may for example register pulse values, heart frequency, and other vital parameters on which to base the damper settings. If the user overexerts himself (state of exhaustion) or if he lies outside a useful training range, the haptic feedback points this out and/or the damper adapts automatically and adaptably, so as to cause the user to revert to a useful training range, which is preferably not detrimental to his health.

The damper properties may also be adjusted taking into account other sensor values and for example the vital parameters for the characteristic quantity. Thus the required force may be increased as the user's pulse indicates a warmed up muscular system. It is also possible, until a specific vital parameter value or other characteristic quantity is registered, for the damper to be set hard enough for specific angles of rotation so that the user cannot bring the operating member to this angle of rotation. This prevents straining the muscles as training begins.

In preferred specific embodiments the rotary damper presently described may be employed in fitness apparatus as a damper and in particular a hybrid damper for existing systems. In this case the rotary damper, which e.g. shifts in the range of milliseconds and continuously, may be connected in parallel to an existing, comparatively inertial brake (e.g. friction brake, eddy-current brake or other suitable brake) in a training apparatus and e.g. a fitness bicycle (e.g. cycle exerciser or the like). This allows to compensate peak loads (e.g. due to kinematic conditions), non-uniformities, vibrations, wear and tear, bearing play and other play etc. This is advantageously done as a controlled system.

Hereinafter, "single action" e.g. refers to one pedal turn in a stationary bicycle, a partial or complete rowing movement (e.g. drive, stroke, recovery or the like) in a rowing machine, opening and closing a door etc. Alternately it may mean a movement of the operating member of the training apparatus.

The rotary damper presently described may be employed as one single energy conversion member (e.g. a brake or the like) so as to enable hitherto impossible or highly individual force/rotational force flows. It is thus possible to vary e.g. the operating force/momentum not only from one single action to the next single action (e.g. not only per full rotation, per full stroke) but even during one single action. In particular can the force/momentum be varied by way of travel/angle so as to result in a repeatedly changing momentum during one rotation and thus in a controlled torque characteristic/characteristic curve during one rotation).

In the case of a rowing machine one can thus generate, e.g. during a complete rowing movement sequence, the precise characteristic torque curve (e.g. force curve of the human hand), adequately to a rowing movement in a boat in the water. The rotary damper presently described preferably simulates the rowing or actuating kinematics, depth of plunge, displacement speed, pitch angle of the blade, and many more force curves of this sport.

In all the configurations it is possible to realize an e.g. adaptive door damper. For this purpose, a parking distance can be measured in the case of a motor vehicle during parking, for example. The distance to the adjacent motor vehicle can be calculated from the data. On this basis the maximum door angle available for opening may in turn be calculated and as or even before it is reached the opening process can be damped and/or limited.

For this purpose, the sensor or the sensors for measuring the distance from the vehicle during parking can be used, so that separate sensors are not necessary. It is also possible to perform the control so that the door initially opens easily and then a pattern occurs, which becomes finer and finer. A haptic display for door openers would thus be practically implemented, which indicates when the stop is approached.

It is also possible to keep doors, windows or the like open at specific angles. This can be implemented in the case of motor vehicles or also in the case of furniture, for example.

The rotary damper may be used as a haptic knob, providing a sensible grid in rotating, so as to result in a haptic feedback in a rotating or pivoting motion of the haptic knob. Such a grid may be generated by a control device in which the electric coil is periodically energized at specific time intervals or the like so as to periodically change the swiveling resistance. The haptic feedback or the damping strength may be changed dependent on the situation, so as to obtain a wide variety of applications. Therefore, an apparatus is also claimed comprising at least one rotary damper that is configured as described above.

The rotary damper may also be used as a vibration damper in or at a pivot point of the swing arm rear suspension or as a steering damper of motorcycles and bicycles, although it is not limited thereto. This can considerably reduce or nearly entirely or completely avoid handlebar wobbling, which may be dangerous, in the case of an unweighted or lifted front wheel. Undesirable vibrations in the steering such as high speed wobbling can (moreover) be reduced. The rotary damper, which may also be referred to as a shear damper, may be installed directly in the steering head (steering head lug in which the fork column pivots).

The rotary damper presently described provides an advantageous device for damping vibrations, wherein for damping translational movements, such translational movement can first be converted into a rotational motion so as to then damp the pivoting motion. The damping strength can be changed at high speed so as to change damping from a minimum to a maximum value within a few milliseconds.

The rheological liquid can consist of greatly varying ingredients, which can be, individually or in combination: Fe, high-carbon steel, NdFeB (neodymium), alnico, samarium, cobalt, silicon, carbon fiber, stainless steel, polymers, soda-lime glass, soda-lime-silica glass, ceramics, and non-magnetic metals and the like. Dimorphic magnetorheological fluids with nanotubes and/or nanowires are also possible.

The carrier liquid can consist in particular of the following ingredients or a combination thereof: oils and preferably synthetic or non-synthetic oils, hydraulic oil, glycol, water, greases, and the like.

For the damper to follow the desired specifics as rapidly as possible, a construction is advantageous where the magnetic field acting in the damping gap can change very rapidly. Particularly suitable in the magnetic circuit is a material that is readily magnetizable (high permeability) and does not retain any or hardly any remanent magnetization (low coercive field strength). Moreover it is intended to damp the eddy currents induced by variations of magnetic flux by way of poor electric conductivity. Eddy currents can be particularly effectively damped by a laminated magnetic circuit structure of ferromagnetic sheet metal.

The magnetic circuit and the electric coil are preferably configured so as to provide the coil with the lowest inductance possible. It is advantageous to supply the coil with an operating voltage higher than required for driving the maximum current (voltage boost) so as to enable considerably faster sudden current variations. Pulsed driving furthermore allows to set any desired current. A full-bridge (H-bridge) driving is for example suitable for rapid current intensity changes in both directions, i.e. power amplification and attenuation.

The energy required for rapid load alterations is preferably provided by a low-impedance source such as a capacitor or a battery in the vicinity of the consumer.

In the most ordinary configuration a switch may be a mechanical switch/push button; the use of a transistor is advantageous. Other possibilities are conceivable as well such as a relay, or special transistor types (MOSFET, IGBT). The switch may among other things also be provided in the GND branch, i.e. between the coil and ground (GND). The current may be measured in any desired spot in the circuit. A flyback diode allowing the electric coil to continue to drive current after opening the switch may likewise be provided. The diode may also be replaced by a switch (Sync-FET).

Driving by way of a full bridge (H bridge) is also possible. The electric coil can thus be controlled in both directions, i.e. the polarities at the electric coil connections can be switched. This allows to boost or attenuate e.g. a permanent magnet in the magnetic coil circuit. In the case of pulsed driving (PWM) the coil current may be varied. Other than the simple controlling option, this configuration also allows to equip the controller with various sensors enabling to build up a control circuit. Depending on the intended purpose, e.g. pressure, force, travel, temperature, speed, or acceleration sensors may be used. A combination of these or other sensors is also conceivable.

A control unit (electronics) processes the system quantities and kinematic quantities preferably continuously, and on the basis of the measurement data and the known system behavior, determines the suitable damper force or the suitable damper momentum.

A controller and/or control unit may be based on fuzzy logic and/or learning.

Controlling may be provided as learning/self-learning for influences such as aging and/or temperature factors. Furthermore it may be learning/self-learning for optimal damping for specific movement profiles. Specific or recurrent load conditions may be taken into account.

The controller may be provided for autonomous learning or for user optimizing/adapting.

To allow recognition of suitable/optimal damping for any and all conceivable operating states, characteristic quantities are generated on the basis of all the measured quantities available in the system. They signal whether damping is set adequately or less than optimal. These characteristic quantities are preferably generated continuously/periodically at fixed time intervals.

The characteristic quantities represent a degree of the damping quality. Computation may be based on any and all measured quantities available in the system. Preferably the kinematic quantity information of all of the actuators available in the system is used.

The characteristic quantities are preferably computed by way of directly processing the sensor signals and/or through algorithms further processing this information; for example frequency analyses etc.

The characteristic quantities represent for example a measure for vibrations and/or ripples. Alternative expressions of characteristic quantities are likewise conceivable.

Then the controller can interpret these characteristic quantities.

Generally speaking, any and all available system information, specifically the kinematic actuator quantities, can be used for the purpose of monitoring.

Monitoring preferably takes place in real time. Or at best at fixed time intervals. Time intervals <10 ms appear to be realistic and advantageous.

The user of the device may likewise interpret these characteristic quantities. Output is for example provided on a display etc.

It is possible for the user to manually adjust the damping characteristics in operation to generate optimal damping for any operating state. The interpretation of the damping quality then in particular takes place through the automatically generated characteristic quantities.

The user thus has the option to personalize actuating sequences. This allows to obtain and store optimal damping characteristics for specific loads in specific operating states. Obtaining/storing time sequences of the damping characteristics is also conceivable.

Thus the user may generate/store/retrieve specific optimal actuating programs for specific/recurrent actuating patterns.

It is thus for example possible to generate energy-efficient or user-friendly actuations for retrieval for recurrent applications.

It is likewise possible to provide a control unit for automatic learning/carrying out all of the above.

It is for example conceivable to have the control unit advise the user about the characteristic quantity following each operation on the basis of the obtained characteristic quantities for optimal damping.

Then the user can store the time sequence for future recurrent operations.

The controller may furthermore be provided for self-leaning and/or automatic response to aging phenomena, correspondingly adapting the controlling of the actuators to ensure always optimal damping.

The controller may furthermore be provided for self-leaning and/or automatic response to temperature influences, correspondingly adapting the controlling of the actuators to ensure always optimal damping.

The temperature in the actuators may markedly increase in operation so that the damping characteristics may noticeably vary in auto-controlling. It is therefore advantageous to compensate the temperature influences by an always consistent behavior in the course of controlling.

Conventional actuators do not provide for this.

The present system can achieve this by way of measuring the actuator temperature—for example with a PT1000 in the coil or alternative concepts—and adjustment corresponding to the known temperature influences is performed on the basis of the temperature information.

The kinematic actuator quantities may be measured directly e.g. by displacement sensors, speed sensors, or acceleration sensors.

It is furthermore conceivable to generate the pertaining kinematic quantities by way of suitable algorithms on the basis of a measured quantity. The base measured quantity employed may include e.g. displacement sensors, speed sensors, or acceleration sensors. The algorithms are preferably based on a Kalman filter. Alternative signal processing algorithms are likewise conceivable.

At least one suitable control algorithm is preferably used for computing the optimal damping force for at least part and preferably all of the actuators (dampers) used at any random controlling time. Clock cycles of up to 50 microseconds may be required for optimal control. To this end in particular a plurality and preferably all of the information is taken into account relating to the currently prevailing kinematic quantities of a plurality and preferably all of the employed actuators. Furthermore, in particular a plurality and preferably all of the information from a plurality and preferably all of the available system quantities is taken into account such as all of the measured system accelerations.

A primary central control unit may be provided for computing the optimal damping for each of the actuators (dampers) employed. The information on optimal damping is then transmitted to the pertaining actuators for implementing/generating.

It is likewise possible to provide for a decentralized computation of the optimal damping for each of the actuators (dampers) employed. Each of the actuators possesses its own control unit to compute and implement the pertaining information.

It is likewise possible for each of the actuators to possess its own control unit, one of the control units operating as a computing center. It represents the master electronics and processes/computes the primary controlling strategy, transmitting the pertaining information on optimal damping to the other actuators available in the system (slaves).

Other than computing the optimal damping, in particular for any and all of the actuators available in the system, it is important to ensure by means of suitable control, for the actuator to implement this optimal damping on schedule. The operative actuator momentum is proportionate to the coil current. The optimal damping information is accordingly proportionate to the coil current. Accordingly a control unit must ensure that the real coil current in operation corresponds to the computed coil current for optimal damping. Due to the prevailing coil inductances no sudden current variations in the coil and thus no sudden actuator momentum variation can be generated. Preferably at least one current regulator is used to minimize the ensuing time constants. The current regulator is in charge of causing the real coil current to follow the intended coil current as quickly as possible (for optimal damping).

A central control unit may take over the implementation/computation/realization of the current regulator for all the actuators used in the system.

It is likewise possible to provide for a decentralized implementation/computation/realization of the current regulator for one single actuator (damper) employed. Each of the actuators possesses its own control unit to compute and implement the pertaining information.

Any form in particular requires the information on the prevailing coil current for a current regulator. Suitable sensors—e.g. shunt etc.—may be used for obtaining the information. A frame of reference for estimating the prevailing coil current is likewise conceivable.

The current regulator may be considered to be a momentum control.

At least one torque sensor may be employed for more precision of momentum control. Then the moment of resistance of the one or more actuator(s) is controlled by way of the sensor signal of the torque sensor and a current regulator may be dispensed with.

A combination of a current regulator and a primary torque regulator is also conceivable.

The primary computation of the optimal damping may in turn take place centralized or decentralized.

These two controlling tasks may be considered separately from one another.

An algorithm may take into account and compensate for any aging phenomena in the system which may change the operating performance.

Depending on the material used, a permanent residual magnetic field may remain in the material, depending e.g. on the number of switching actions (on/off). This will raise the base momentum. An alternating field showing decreasing amplitude may eliminate the residual magnetic field as needed or on a regular basis.

This allows to accept larger material tolerances etc. regarding the quality which in turn reduces manufacturing costs.

The range between the minimum and required maximum force or minimum and required maximum momentum is the required operating range.

An apparatus is preferably equipped with at least one rotary damper providing for the rotary damper to damp linear movement.

Further advantages and features of the present invention can be taken from the description of the exemplary embodiments which will be discussed below with reference to the enclosed figures.

BRIEF DESCRIPTION OF THE SEVERAL
VIEWS OF THE DRAWING

Figure 2:
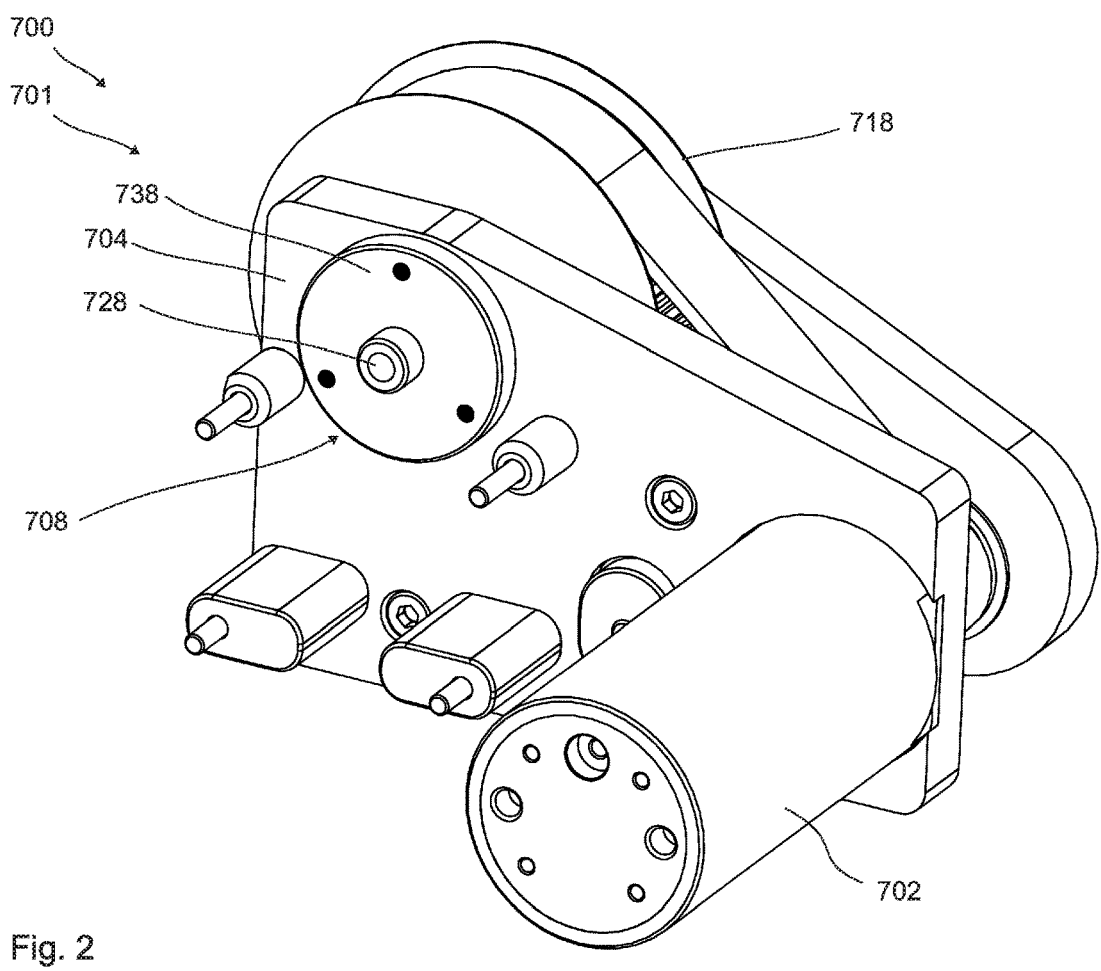
Figure 14:
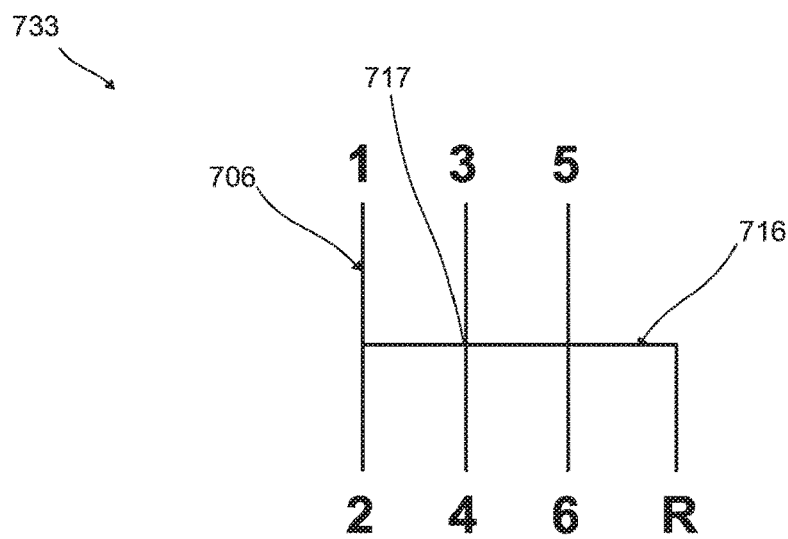
Figure 15:
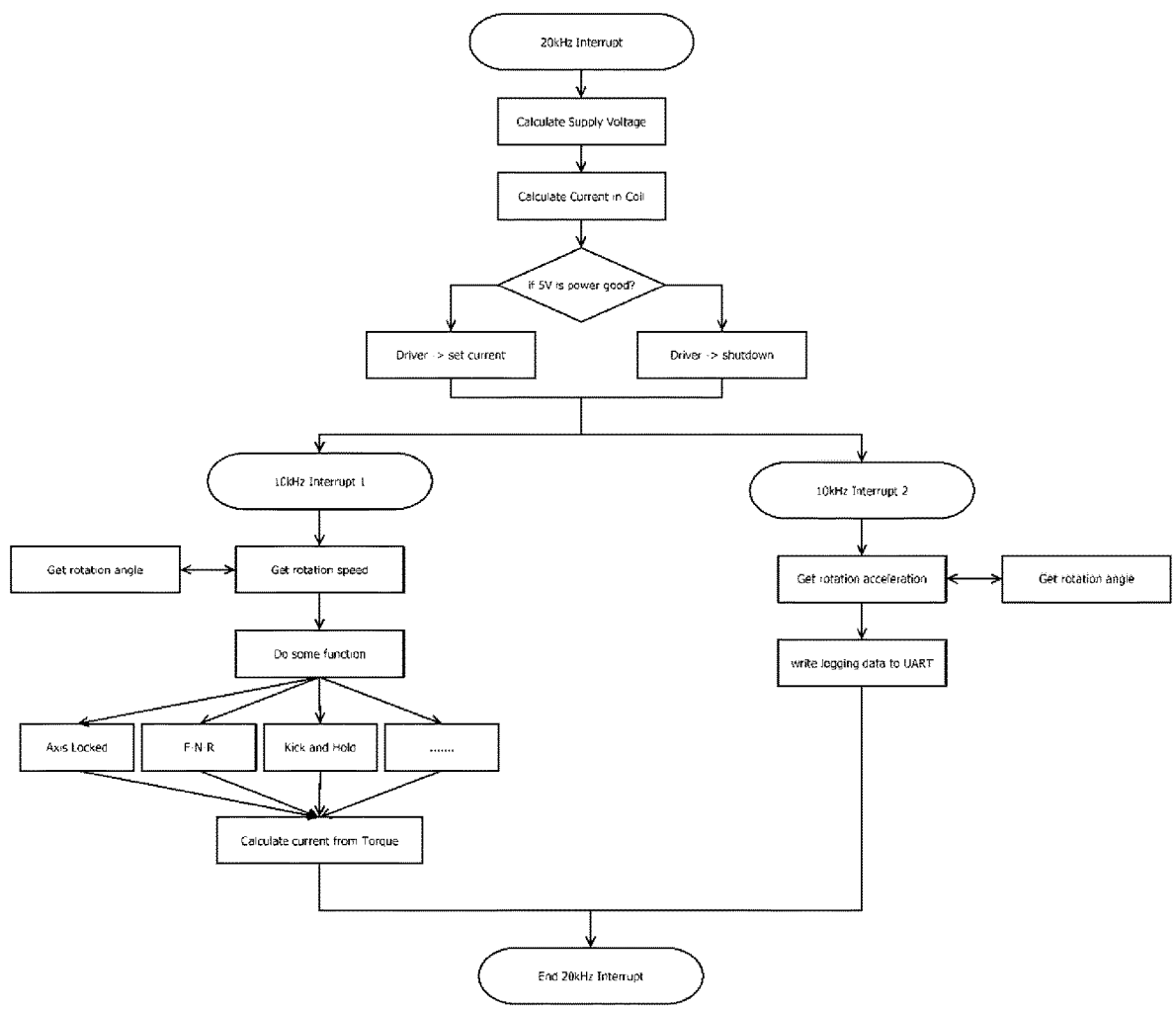
Figure 16:
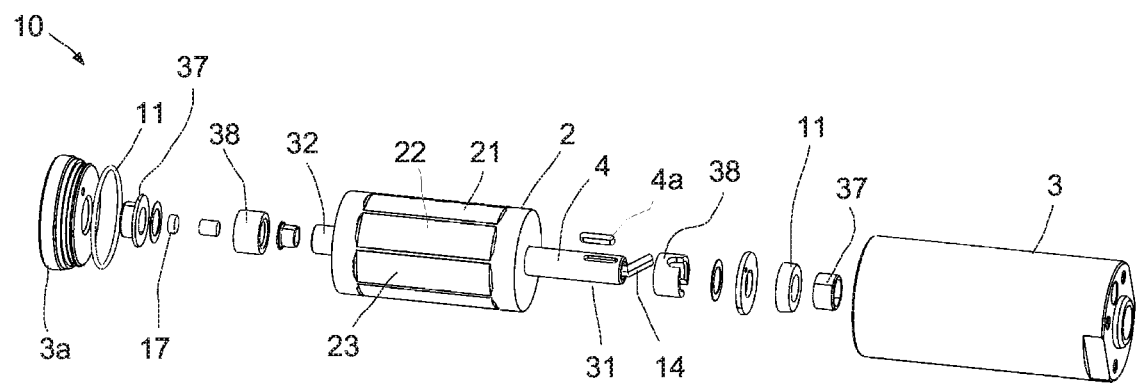
Figure 17:
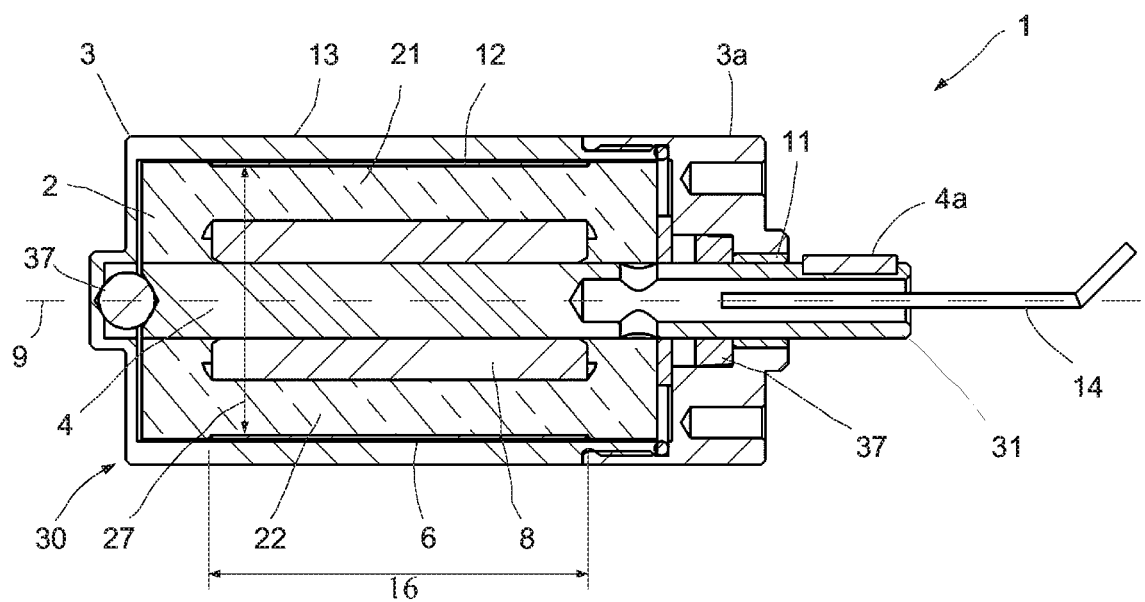
Figure 18:
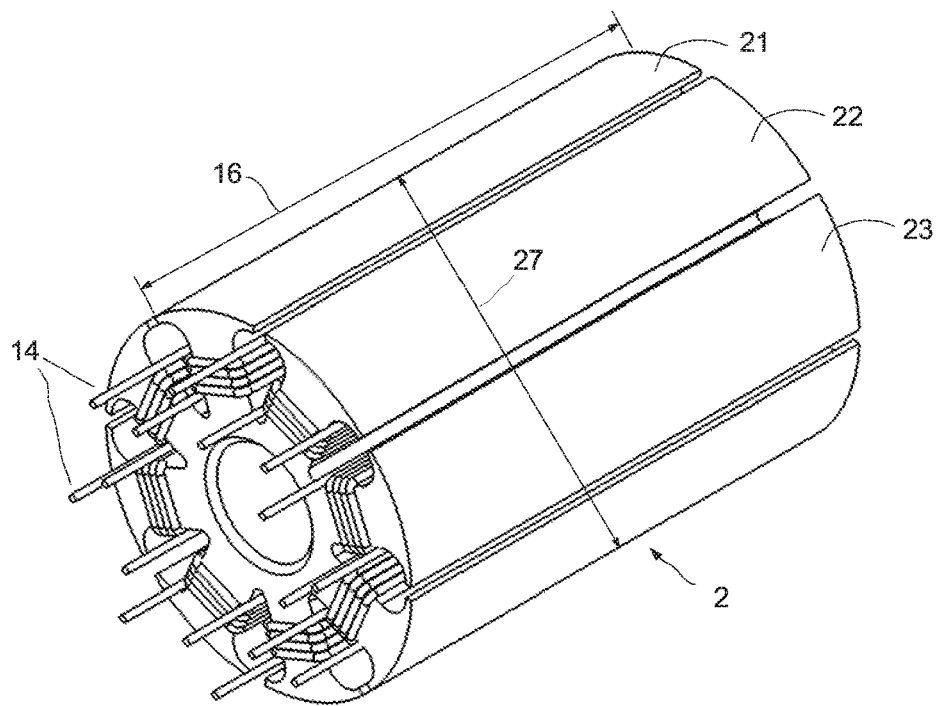
Figure 19:
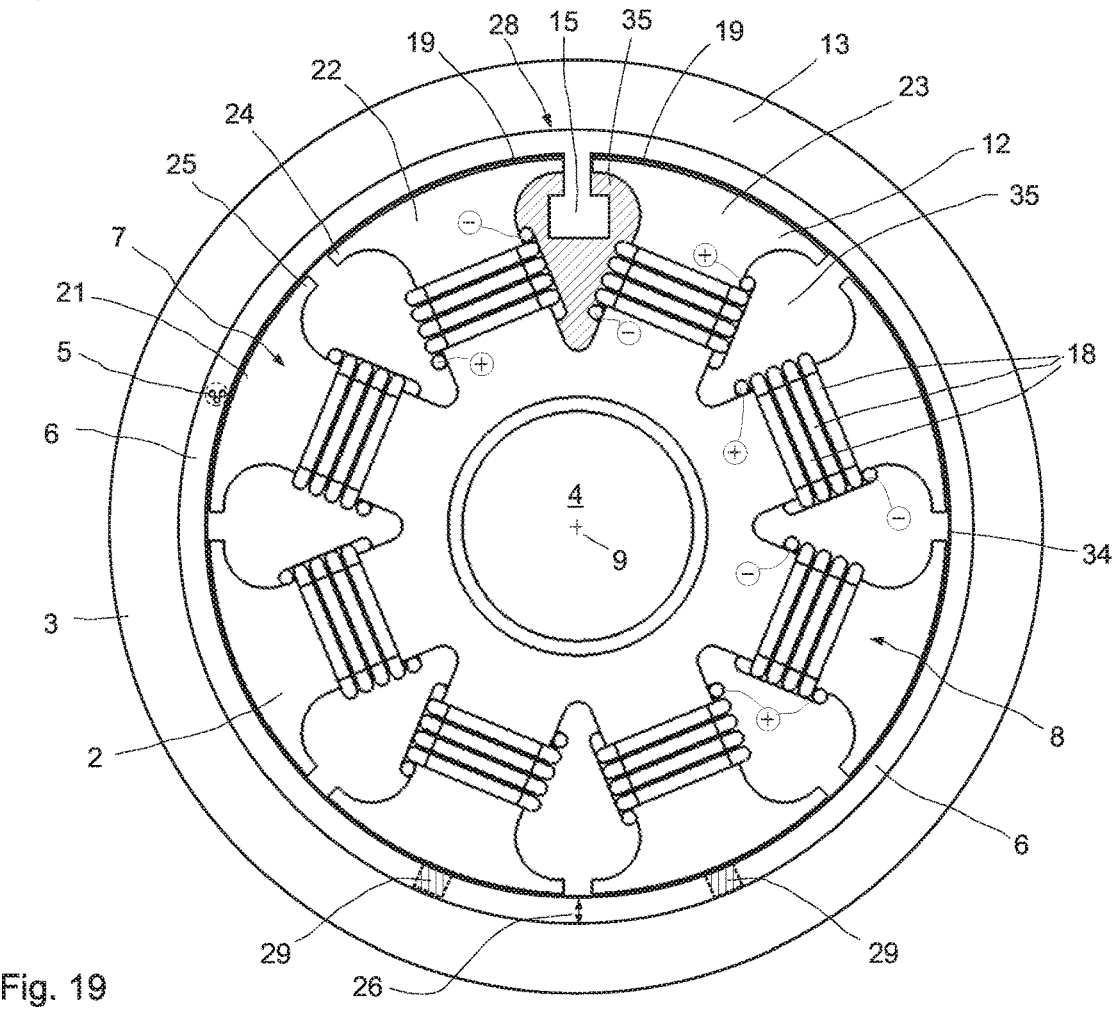
Figure 20:
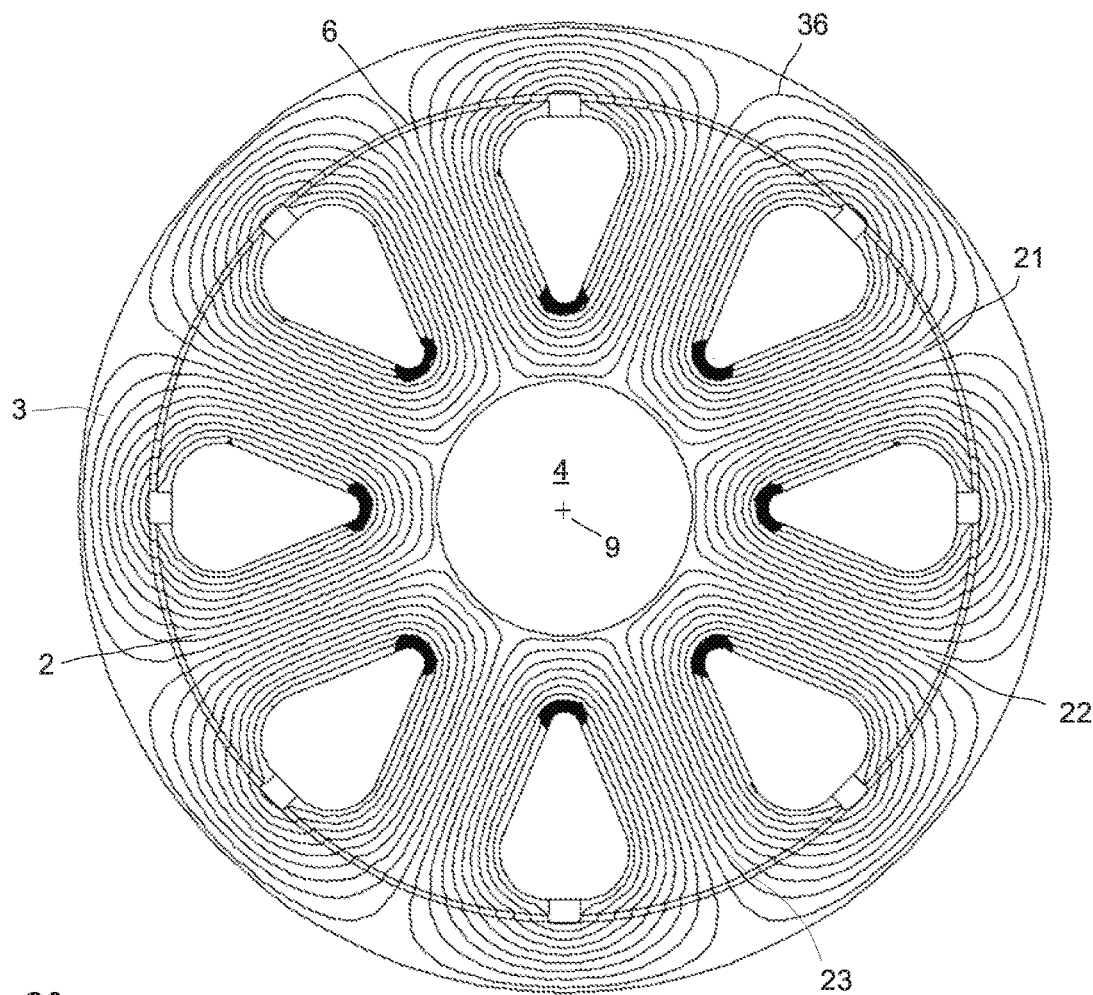
Figure 21:
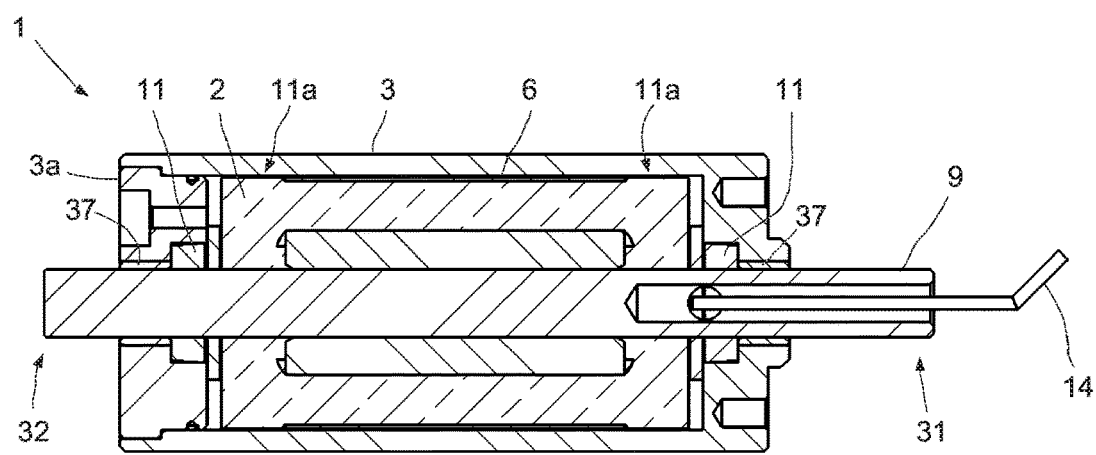
Figure 22:
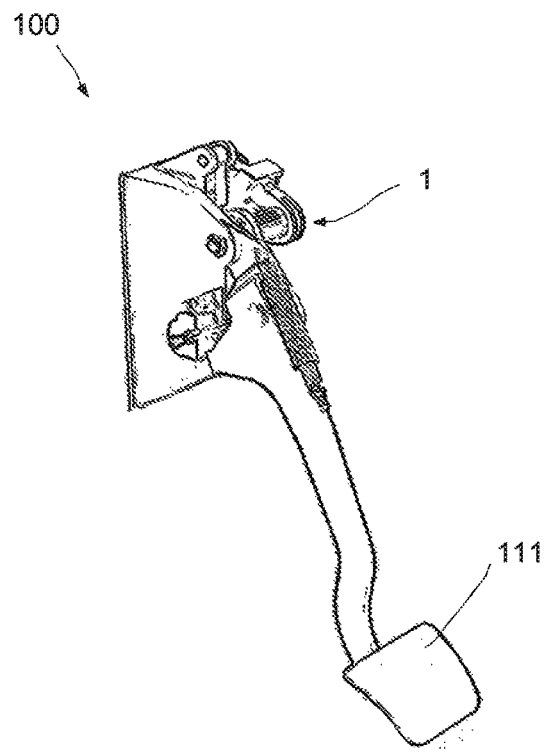
Figure 23:
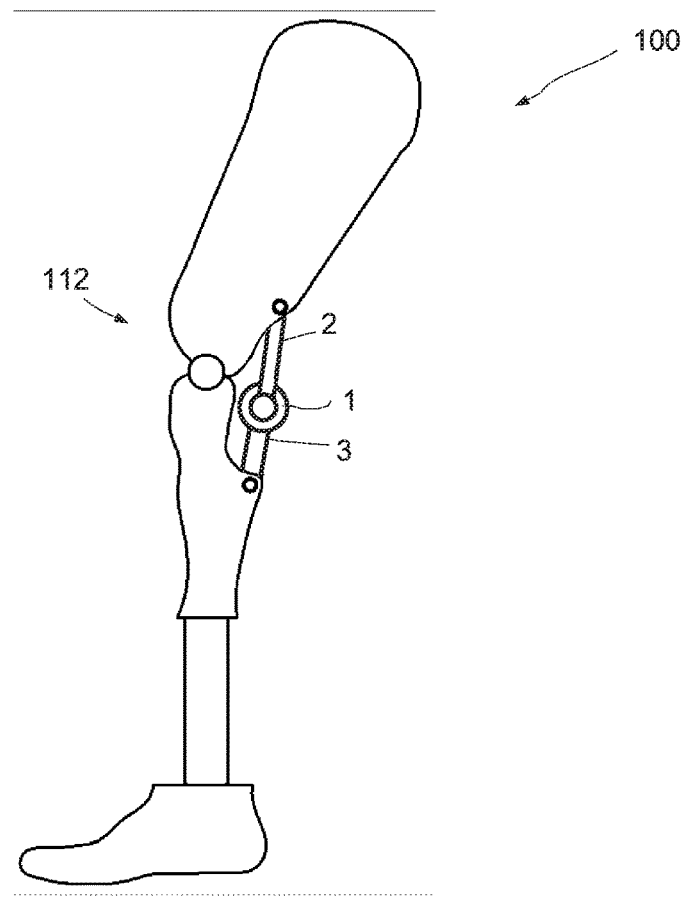

FIG. 1 a partial cutaway side view of a purely schematic illustration of an input system including an input device according to the invention;

FIG. 2 a perspective view of a detail illustration of the input device of FIG. 1;

FIGS. 3-13 purely schematic sketches of progressions of deceleration torques;

FIG. 14 a purely schematic illustration of a slide gate mechanism simulated with the input device according to the invention;

FIG. 15 a sketch on signal processing in the input device according to the invention;

FIG. 16 a schematic exploded view of a rotary damper;

FIG. 17 a schematic cross section of the rotary damper of FIG. 16;

FIG. 18 a perspective view of a part of the rotary damper of FIG. 16;

FIG. 19 a schematic cross section of the rotary damper of FIG. 16;

FIG. 20 schematically inserted magnetic field lines in the rotary damper of FIG. 19;

FIG. 21 a cross section of another rotary damper;

FIG. 22 a schematic, perspective view of an operating pedal;

FIG. 23 a schematic view of a prosthesis; and

Figure 24:
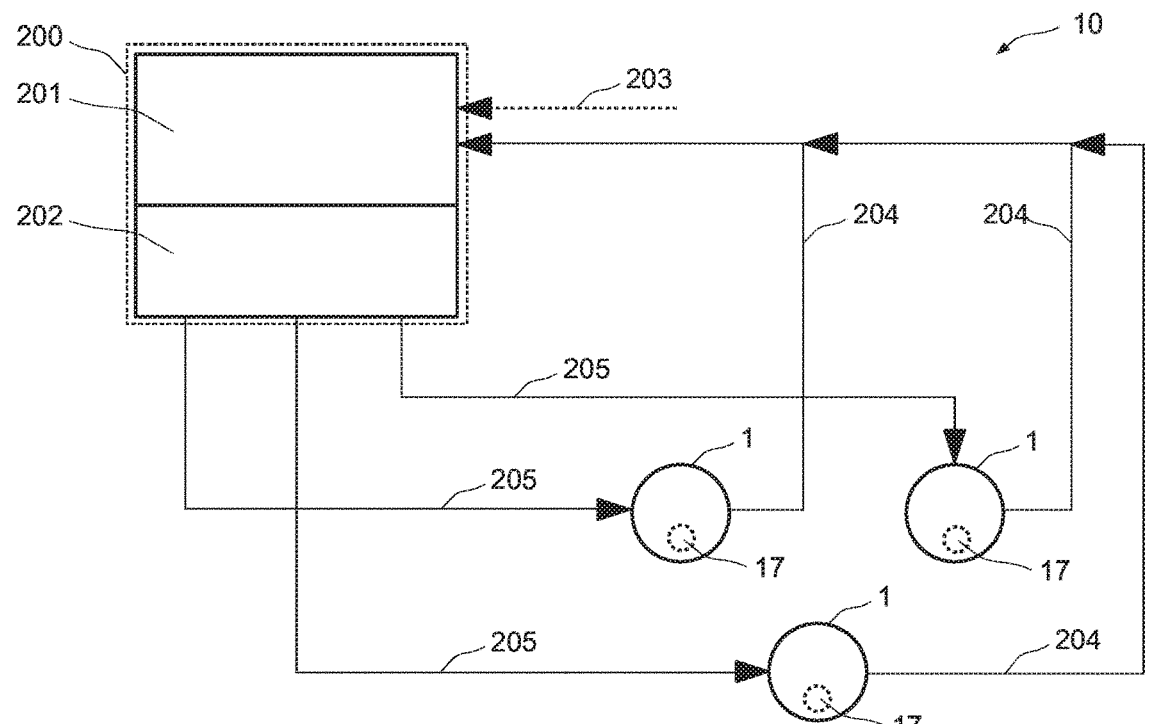
Figure 25:
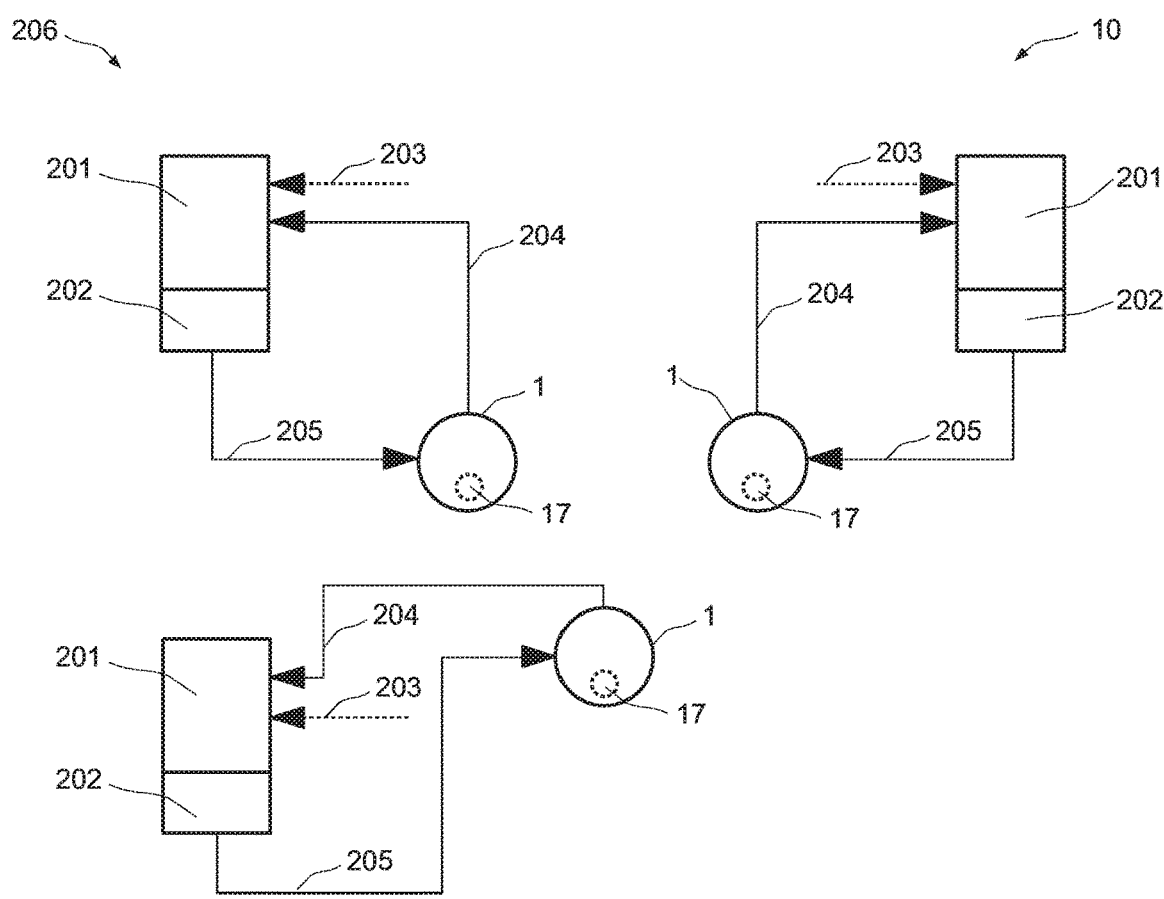
Figure 26:
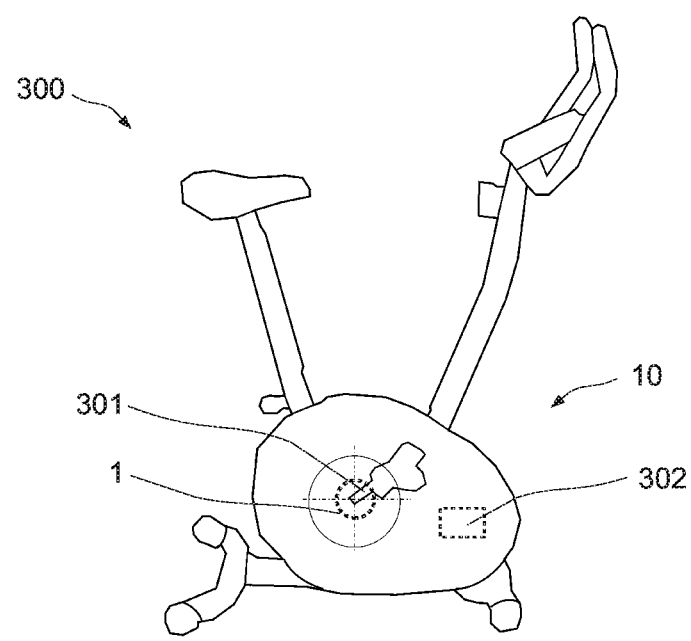

FIG. 24 a simplistic sketch of the control of the damper device;

FIG. 25 a simplistic sketch of another configuration of the control of the damper device; and FIG. 26 a training apparatus or fitness apparatus.

FIG. 1 shows an input device 700 according to the invention, configured as a joystick 711, which is part of an input system 720, and which is operated using the method according to the invention. Moreover the input system 720 comprises an input receiving unit 710 coupled with the input device 700, which is for example configured as a utility vehicle or as a computer. The input device 700 allows to make entries in the input receiving unit 710. The operating lever 705 is equipped with a switch 721.

The input receiving unit 710 does not need to be directly wired with the input device 700, it may be connected through a radio system or signaling system or a network. Also, the input receiving unit 710 can be spatially remote from the input device 700, e.g. for controlling an unmanned aircraft (e.g. drone).

The input device 700 comprises an operating device 701 with an operating lever 705. The operating lever 705 is presently accommodated on a supporting structure 704 for pivoting around two or more pivot axes 706, 716. Only one pivot axis 706 is shown in detail for better comprehensibility. Moreover the operating lever 705 is attached to the supporting structure 704 by means of a joint 714. After actuation, a resetting unit 707 can return the operating lever 705 to a neutral position 717.

Damping the pivoting motion of the operating lever 705 is controlled by a magnetorheological brake device 702 (also referred to as MRF-brake). For this purpose the brake device 702 is coupled with the pivot axes 706, 716 via one or more transmission stages 708. The transmission stage 708 is configured as a belt drive 718.

This brake device 702 is for example configured as a rotary damper 1 or as a magnetorheological transmission device 2.

The pivoting motion of the operating lever 705 is transmitted to a rotation axis 728 of the belt drive 718, and via the belts, to the brake device 702. Thus, the brake device 702 is caused to perform a rotational movement as the operating lever 705 pivots.

The transmission stage 708 and the supporting structure 704 and also the brake device 702 are illustrated in detail in the FIG. 2. Here the force transmission from the operating lever 705 to the shear damper, which is elongated and cylindrical, of the brake device 702 is shown on the bottom right, in the front in the figure. The operating lever 705 is flange-mounted to the wheel 738 on the top left, so that during pivoting, it sets the transmission 708 and the shear damper rotating via the toothed belt.

The brake device 702 is selected by a control device 703 so that the deceleration torque can be adapted to the current operational situation. For this purpose the pivoting angle of the operating lever 705 is detected by means of a sensor means 734. The sensor means 734 comprises e.g. an encoder, rotary encoder, Hall sensor, or other suitable sensor. The sensor e.g. detects an absolute or relative position. The pivoting angle of the operating lever 705 is detected e.g. via the angular position respectively the rotation angle of the brake device 702 or of the transmission stage 708.

This allows to generate a haptic signal, which can be perceived in the operating lever 705, and e.g. a defined sequence 713 of deceleration torques. Thus, the user receives, as a result of an input made and/or while making an input, a haptic feedback (so-called force feedback). The haptic signal is generated by the control device 703 as a result of a control command. The control command is for example lodged in the control device 703, e.g. as an angle dependent function, or is generated therein, based on lodged algorithms. The control device 703 can, for example, also receive the control command from the input receiving unit 710.

Moreover, the operating lever 705 can be automatically returned to the neutral position 717 after an actuation. Damping the resetting motion is presently controlled by the brake device 702.

The invention provides an input device 700 and in particular an advantageous joystick 711, in which the detent positions are not fixedly specified mechanically, and/or wherein the behavior of the joystick 711 during movement is not fixedly specified mechanically, which moreover can be provided with a force feedback, which in particular requires little mounting space, and is moreover inexpensive in manufacture. The low power consumption and the low weight are moreover advantageous, depending on the location of use.

In order to achieve this goal, a shear damper or wedge damper, acting as a controllable brake device 702, can by means of magnetorheological liquid, damp the movement of the joystick 711, respectively generate the torques required therefor in the pivot point, respectively forces on the lever 705.

A linear (pivoting) motion X-Y (of the joystick) is in particular first converted to a rotational motion and then damped. A transmission may be installed so as to provide sufficiently strong resistance (force on the lever member or torque in the joystick pivot point). The gear ratio may be 2:1 or 3:1 or 4:1 or more. In a concrete variant it is approximately 3:1. High gear ratios show the drawback of (inter) play and require more mounting space. However, they allow to correspondingly increase the braking momentum of a shear damper. In a concrete configuration it is lower than or approximately equals 4 Nm, so that a transmission of 3:1 can provide a controllable braking momentum in the joystick of 12 Nm. Transmission may be performed via a gear transmission including suitable gear wheels, e.g. spur gear-, worm gear drive, or having a toothed belt, V-belt, chain, harmonic drive gear.

DESCRIPTION OF THE INVENTION

The shear damper principle is described in WO 2016/156544 A1 to the applicant, and it may be used with a joystick. The disclosure of WO 2016/156544 A1, pages 1 to 41, including pertaining Figures on pages 1/6 through 6/6, is included herein by reference, and the disclosure content of the claims is included in this application by reference. In the concrete case, a shear damper with magnetorheological liquid and a braking momentum of 4 Nm shows the dimensions of 32 mm (diameter)×80 mm length, i.e. a structural volume of ca. 65 000 $mm^3$. In contrast to this, an electric motor having a torque of ca. 4 Nm (stepper motor, servo motor) shows the approximate dimensions of 100×100×200 mm, thus a structural volume of ca. 2 500 000 $mm^3$. This is approximately 38 times the structural volume of the shear damper.

Alternatively, the magnetorheological wedge principle may be used for a brake device (brake/damper), as it is described in WO 2012/034697 A1 to the applicant. The disclosure of WO 2012/034697 A1, pages 1 to 59, including pertaining Figures on pages 1/10 through 10/10, is included herein by reference, and the disclosure content of the claims is included in this application by reference. The magnetorheological wedged damper is structured still smaller than the magnetorheological shear damper, its dimensions are ca. 40 mm (diameter)×20 mm, thus having a structural volume of ca. 26 000 $mm^3$, which is almost 100× less than in the electric motor.

This results in considerable improvement to the mounting space in the use of a brake device, on the basis of a shear damper or a magnetorheological wedge damper. The component weight is approximately directly proportional to the structural volume, thus it is also considerably less in the invention. The mounting space and the weight are a decisive criterion in many applications.

Hydraulic or pneumatic systems require less space than do electric motors, but lines and auxiliary systems are required instead (pressure accumulator, pumps . . . ). Moreover, the controllability and noise emission are very disadvantageous. None of the two can be employed for computer games respectively in the field of gaming, respectively they do not find the users' acceptance.

Electric motors also show the drawback that, based on their concept, they heat up very much and overheat, if high torques (holding torques) are required in standstill over extended periods (the coil windings heat up, whereby the resistance in the coil wire increases, whereby the heat-up increases still further, etc.). The power requirement and heat-up then increase overproportionately. Magnetorheological brake devices do not show this drawback.

The behavior of the joystick during movement, i.e. the operating force respectively feedback generated thereby (most often by/to the active hand) can be variably controlled with the invention, dependent on the situation. This is achieved in that in controlling the electronics, controlling the magnetic field in the magnetorheological brake device (e.g. in the shear damper), and thus the strength of damping, is regulated respectively varied quickly. The control preferably responds fast to what is the presently applied operating mode respectively use case, and as a result thereof, to the speed and/or speed changes and/or directional changes of the joystick. Use cases are application cases dependent on the situation. An application case bundles a number of scenarios or even all the conceivable scenarios which may occur when a user attempts to achieve a specific goal by means of the system described. A use case may also be referred to as an application situation.

A barrier (increased torque, e.g. up to the maximum value) in one rotational direction is not meant to block in the other rotational direction as well (freewheeling function). If one moves the joystick in the direction to the barrier, the torque should be cancelled immediately, as force ceases to be applied in the direction of the barrier. Otherwise the user feels the joystick adhere to the barrier. The lever virtually remains "stuck", which deteriorates the response (the user's desire) of the vehicle caused thereby. Then, when one moves the joystick back in the direction to the barrier, the torque should be immediately increased, so that the user immediately perceives the barrier again.

A structure including a shear damper allows to convert the linear or pivoting motion of the joystick to a rotational motion of a wheel.

A transmission stage 708 allows to bring the movement to a higher rotation speed, so that the shear damper can transmit higher torque to the joystick. A concretely configured shear damper cannot apply more than 4 Nm braking momentum in the available mounting space. Due to the transmission (e.g. ratio 3:1) the momentum achieved at the joystick may be three times larger. The transmission may consist of gear wheels only, or may be equipped with toothed belt(s), chain(s), friction wheel(s) and the like. Gear wheels show the drawback that their geometry is predetermined by the size of the gear wheels. In contrast to this, using a toothed belt offers more flexibility in the construction and less noise. Use of cross-located gear wheels is also possible, whereby they are without play.

The magnetorheological brake device 702 respectively the shear damper or the MRF brake member may be larger in structure, whereby higher damping-/braking momenta can be generated. In most of the cases, however, a combination of a smaller damping/braking unit with a transmission is a better solution in view of the mounting space, weight, and costs.

Instead of the shear damper, basically any MRF brake device may be used (wedge bearing, swinging vane, etc.). In addition to the advantages indicated above, the gear for transmission is advantageous for saving space, since the brake does not need to be directly flange-mounted, and can thus be positioned as desired.

The fast-response MRF brake (in the range of milliseconds) allows to generate a multitude of haptic feedbacks. The advantages of MRF brakes, such as fast response and an arbitrarily adjustable force/torque in operation, are utilized.

An exemplary signal processing is generally illustrated in the diagram of the FIG. 15.

Exemplary actuations or use cases of the invention will be described below. The FIGS. 3 through 13 show progressions of the deceleration torque over the rotation angle respectively the time.

Spring-biased and non-adaptive joysticks swing/oscillate around the central position (neutral position), when they are released out of their extreme positions and allowed to move freely. This may result in undesirable movements of the mechanism connected with the joystick (e.g. snow shovel of a snow groomer; container load on a harbor crane).

The invention prevents such swinging back in a standard mode. No barriers or ripples are generated. The maximum speed of the joystick motions is controlled (V regulation). The maximum speed is dependent on the position (i.e. the angle) of the joystick. The closer it approaches the zero position (central position), the stronger is the movement braked, and the slower is the possible movement. This prevents the joystick from overshooting around the neutral position. If the joystick is simply let go while it is pushed forward, the resetting spring pulls it back to the neutral position and brakes it precisely toward 0°. Absent active braking it would, particularly if it is first let go from the end travel positions, swing past the central position and then swing back, swinging out over time. The users tend to not desire this, and it is disadvantageous in terms of operation. The swinging (out) movements of joysticks not controlled according to this invention may result in disadvantageous peak loads to the tool/load.

Figure 3:
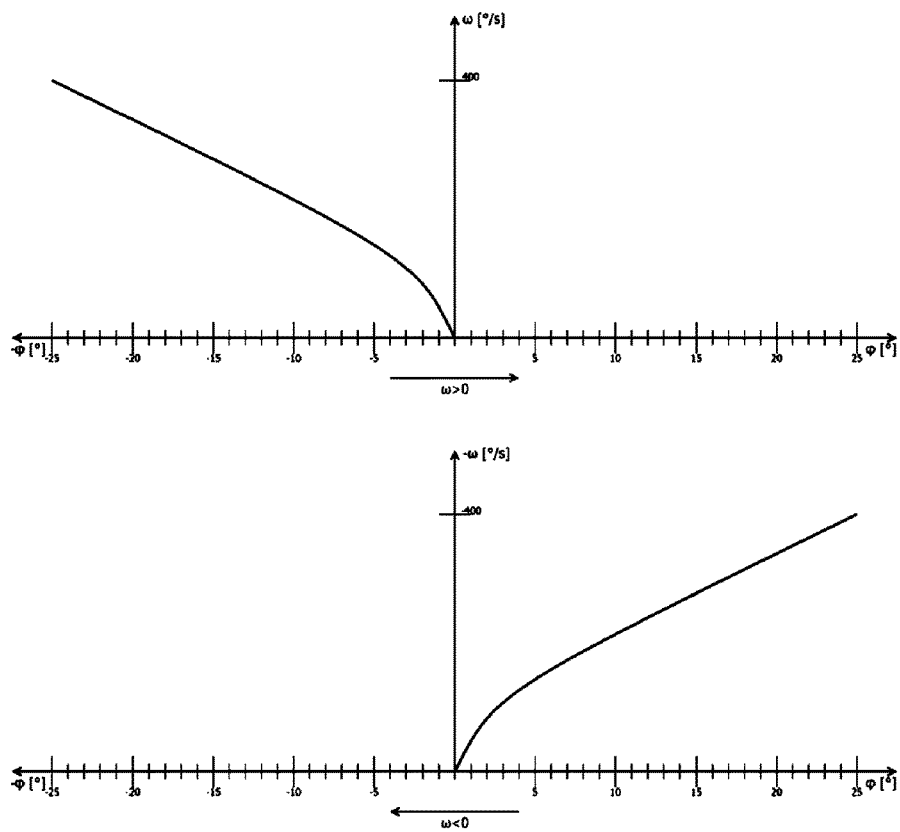

FIG. 3 shows the maximum angular velocity of the shear damper in the joystick, dependent on the angular position of the joystick.

In the operating mode "unidirectional", movement is possible in one direction only.

The motion axis of the joystick is locked from the 0° position in one direction, the shear damper generates a torque barrier in this direction. Movement is only possible in the other direction.

Figure 4:
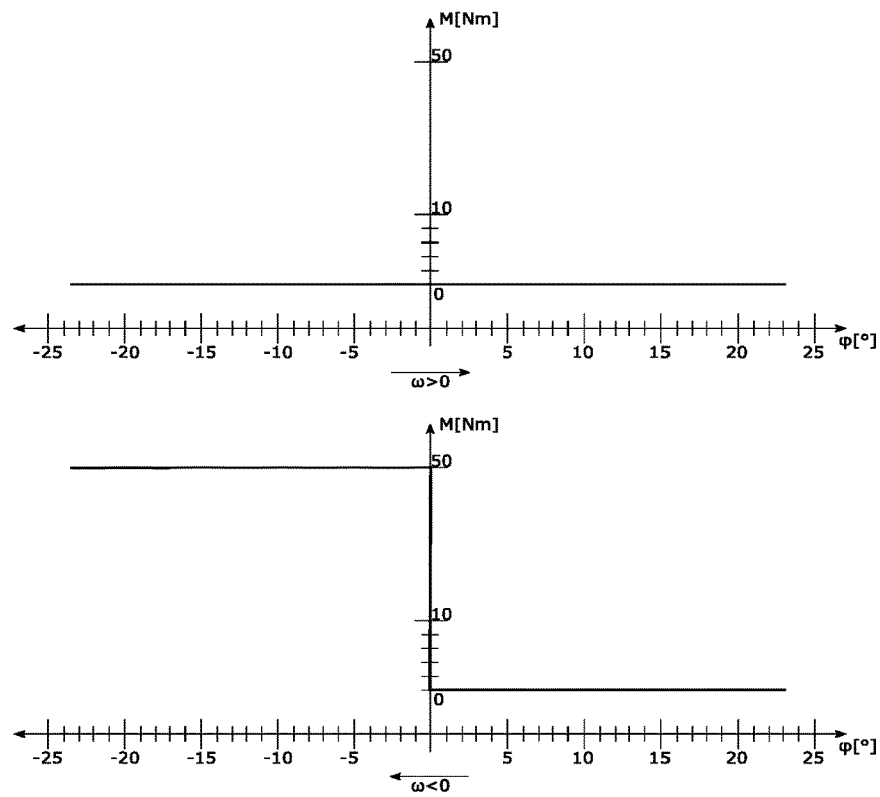

In FIG. 4 the barrier acts (only) in one direction. A torque barrier is generated in one rotational direction. The joystick can only be pushed in the opposite direction.

In the operating mode "smart stop" the joystick can stop in any position. The torque of the magnetorheological brake device, and presently of the shear damper, is adapted to the spring characteristic curve of the resetting spring, i.e. the damper provides the same braking force as the resetting spring applies in the other direction. When a user pushes the joystick to a position and releases it, the joystick remains exactly in this position.

Figure 5:
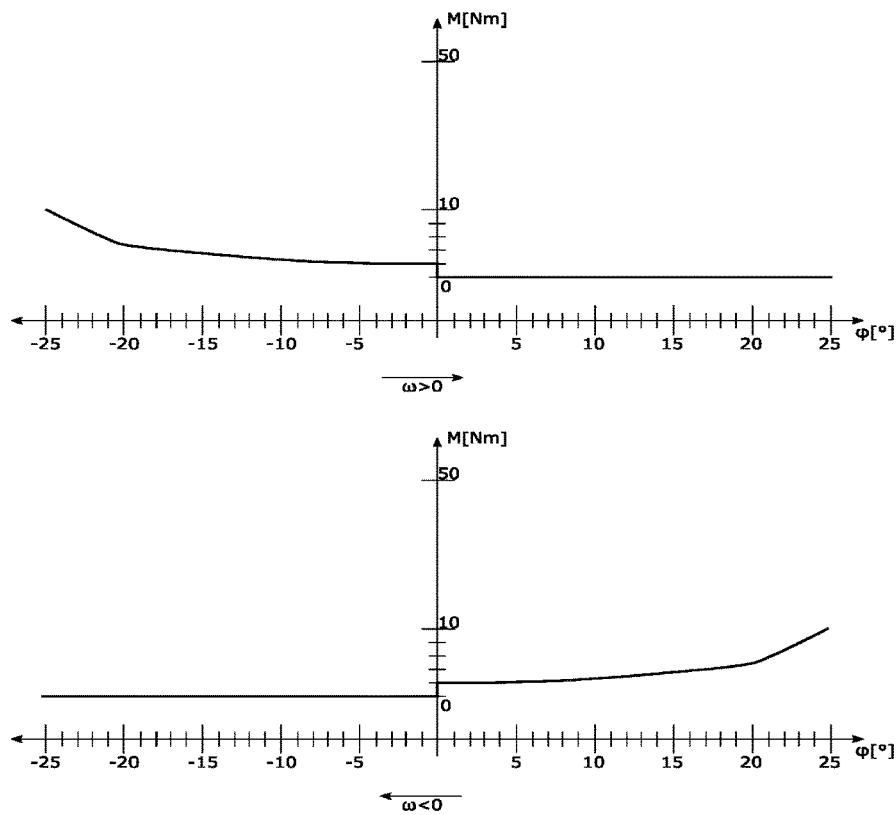

FIG. 5 shows the progression of the torque, depending on the characteristic curve of the resetting spring. The torque is still high enough so that as the joystick is released, it remains in place.

In the operating mode "ripple" the torque on the operating lever and thus the force on the man-machine interface (e.g. hand) is alternated/shifted between low and high values. The user thus feels a pattern of alternating movement and braking. The distances and lengths of each of the torque positions may be controlled, either based on the time, or dependent on the angle, or as combinations thereof. In an angle-controlled ripple, the barriers are started in certain angular positions and retained up to a defined angle (angle-triggered).

Figure 6:
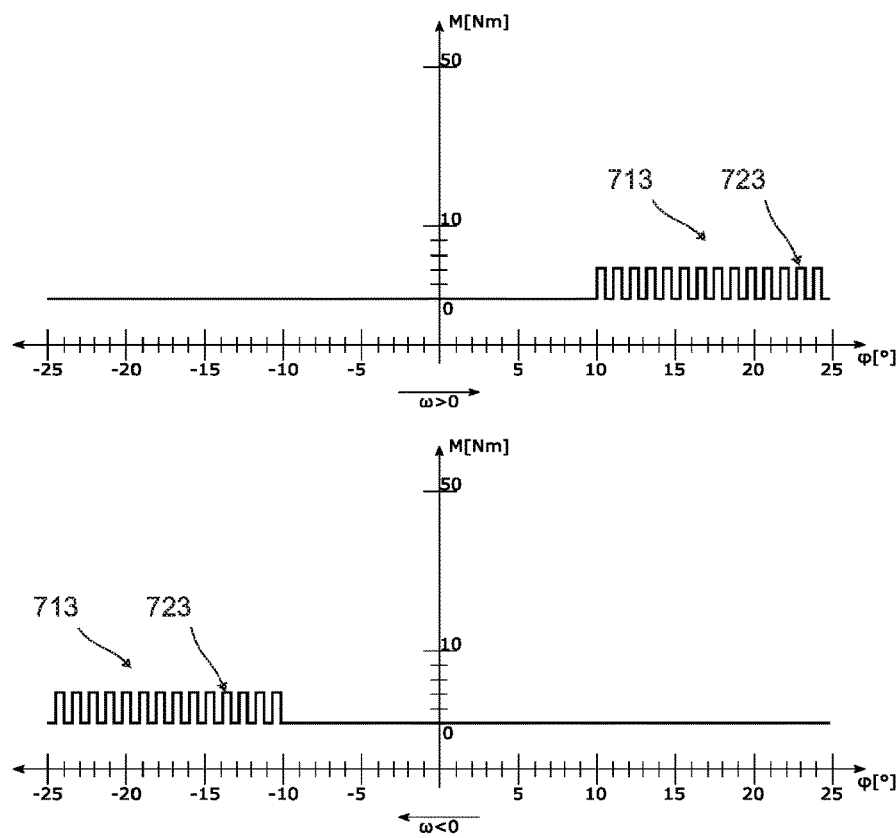

FIG. 6 shows this mode. The ripple begins at 10° and changes the resistance in 1° increments. In this case the ripple is generated in one direction only (no more while returning to the 0 position).

FIG. 6 shows a ripple triggered and controlled by way of the angle. The braking momentum (Y-axis) is alternatingly applied between a high and a low (e.g. basic torque) torque, respectively the force (Y-axis) at the lever is varied between the operating hand and the joystick.

Figure 7:
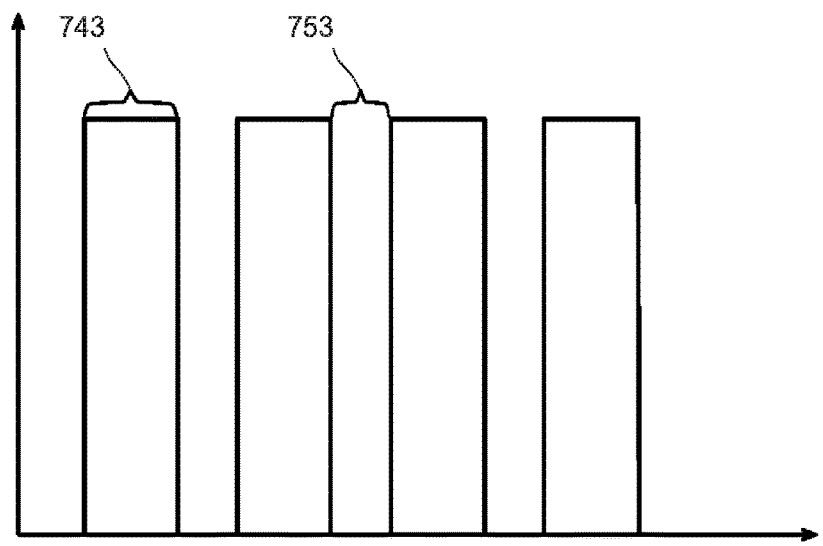

In the time-controlled and time-triggered mode the length 743 of the barriers and also the distance 753 between the barriers is specified regarding the time (FIG. 7).

FIG. 7 shows the time-triggered and controlled ripple. The X-axis shows the time, the Y-axis the force on the operating lever respectively the torque (deceleration torque) in the pivot point. The distance and the length are time-controlled.

Figure 8:
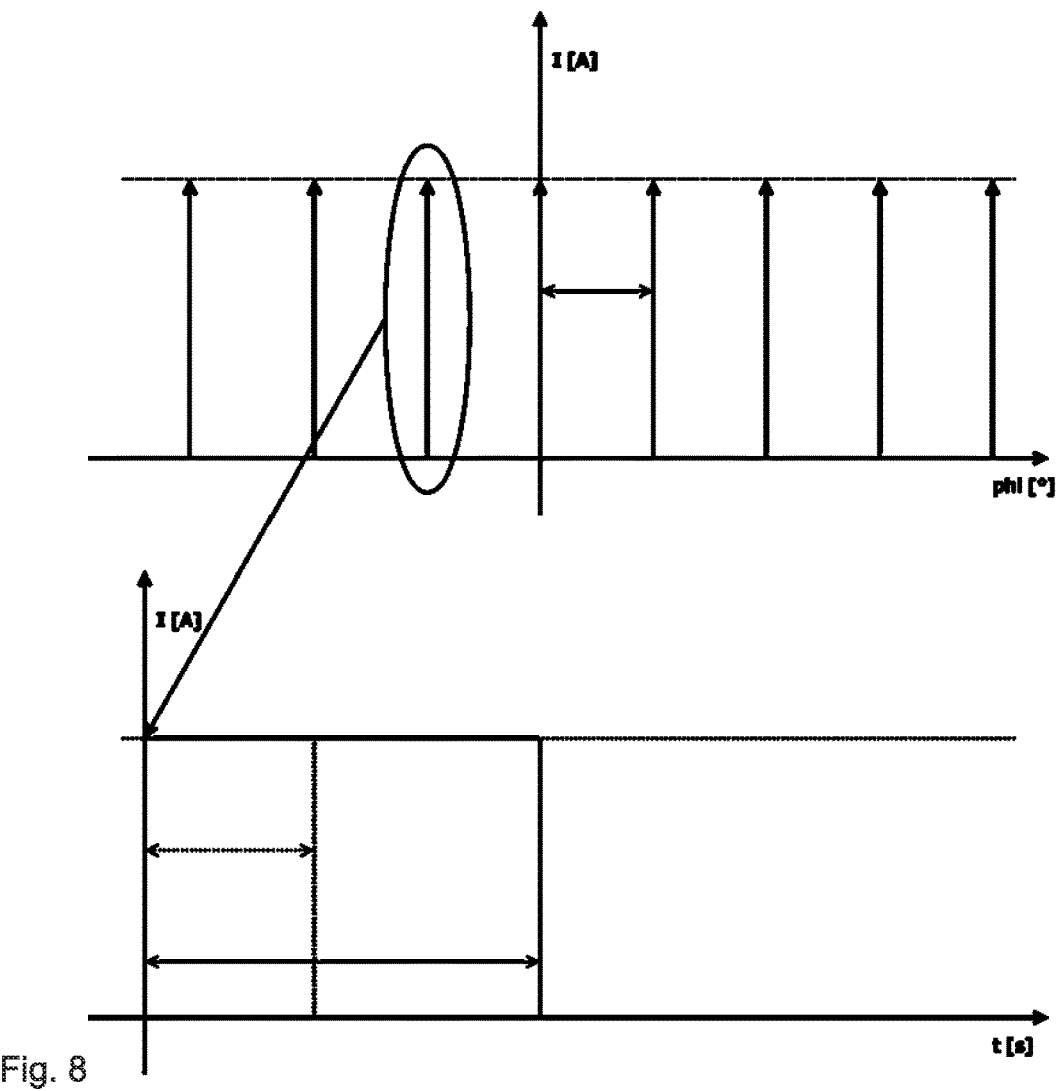

The two modes can be combined by exchanging the triggering. For example, the starting points of the barriers can be determined by the angle, while the length is always given over the same time, as shown in FIG. 8. As the ripples start with a specific angle, the barrier is held over a specific time and then released, no matter what the angle. If an angular position (starting position) is passed over within the duration of one ripple, this ripple point can be omitted or can immediately follow.

This mode allows e.g. to control the motion speed, or a high pass filter for vibrations or fluttering can be realized with a quickly adjustable periodic time. Vibration or fluttering means that the feedback thereby generated provides the feel of vibrations or fluttering to the user's hand.

FIG. 8 shows the time-controlled and angle-triggered ripple. The length is timed, the starting points are defined by the angle.

A ripple mode may certainly be changed by the time or the angular position, e.g. the mode may vary in ripple points after a certain number (turn finer). Thus, the user feels that a certain region has been reached, e.g. approaching the end position, maximum speed etc., in the form of changing ripple lengths (=dynamic adaptation).

The operating mode spring ripple is a modified form of the ripple mode. The ripple barriers are not generated by jumps (low-high; little-much) of the actuator current, and as a result by the magnetic field, but they vary continuously. One can thus feel how the barriers build up and go down. The control signal may be a sine- or cosine signal, at a slight offset from zero. The current varies constantly, without jumps, and briefly turns slightly negative, so that the metal in the damper or the magnetorheological brake device is demagnetized and briefly magnetized again, before the current turns positive again, to thus be again demagnetized and newly magnetized. The user perceives these changes between magnetizing and demagnetizing and the continuous changes to the damping/braking similarly to the braking by means of a detent spring in a slide gate (peak/valley gate).

Figure 9:
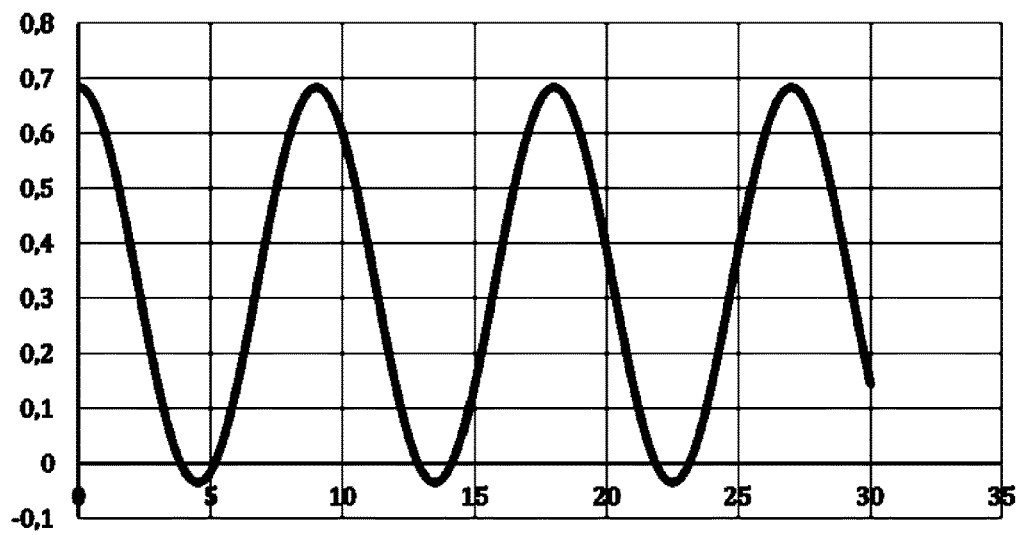

FIG. 9 shows the actuator current in spring-ripple mode. The current changes continuously, having two zero crossings per period.

In addition, the current may be adapted to an, or the, angular velocity. The torque of the damper is dependent on the speed and decreases with higher speeds. In order to obtain the same torque over various speeds, the current must be increased.

Figure 10:
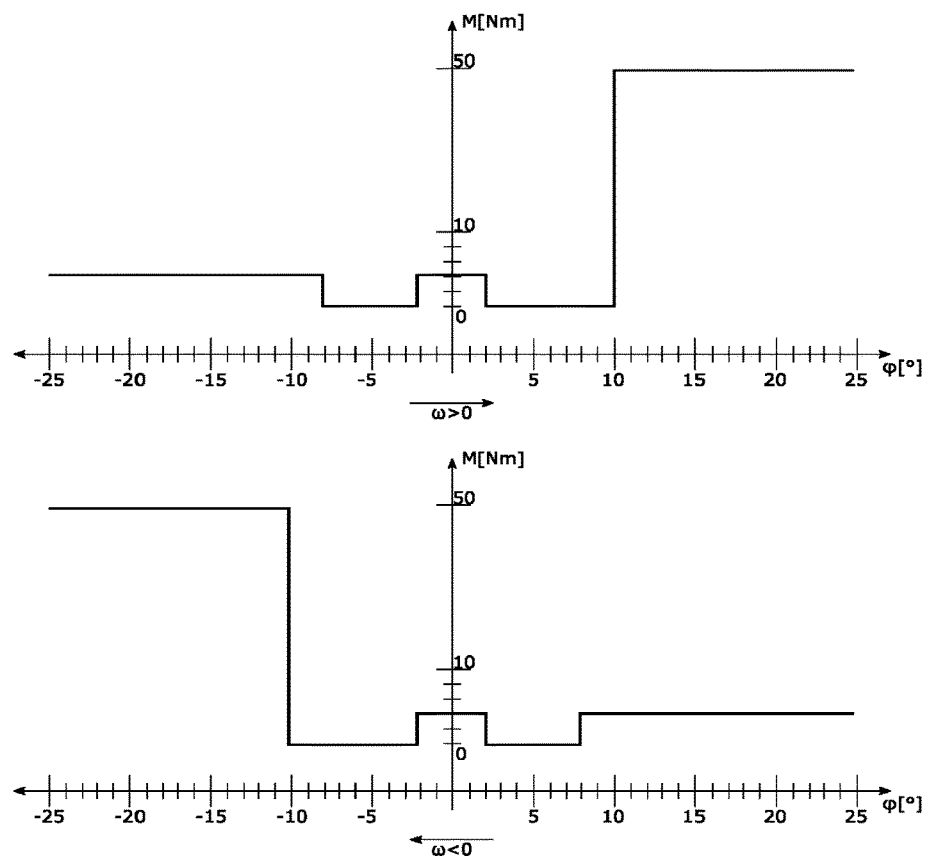

In the operating mode "FNR" (front, neutral, rear) shown in FIG. 10 the joystick can be set between different detent positions (e.g. in an automatic transmission: front, neutral, rear). Between the predetermined detent positions the torque is minimal and as the position is reached, it is raised to a value in which the joystick remains (stays in place), since the spring restoring force is not sufficient for overcoming the braking force. If the user wishes to bring the joystick to another position, the resistance must be overpressed, and it can be moved up to the next position. The detent positions are e.g. at −8°, 0° and 8°. At e.g. −10° and 10°, an end stop in the form of maximum torque is generated.

The advantage of the adaptive MRF technology in this case, over conventional friction/sliding brakes is, that no stick-slip effect (stick effect) will occur. In conventional systems a static friction must first be overcome. Since the dynamic friction is much lower, the brake then slips through, and when it stops once again, it sticks better again; so that jerky movements occur on the joystick and on the operated tools or objects in functional connection with the joystick. Jerky movements may result in high peak loads and overload (increased machine wear). This is not the case with the solution according to the invention, and is a great advantage in use.

In the operating mode "axis locked" a barrier with maximum torque in all the directions is generated (from the zero position). The joystick is thus locked in its movements.

When the joystick is in the zero position, it cannot be moved. If it is deflected at the start, it can be returned to the 0 position and is then locked. If the joystick is deflected in a positive position and is accelerated in a positive direction (as in a negative position with negative acceleration), the joystick will be locked. Otherwise it can move freely, so that it can be returned to the 0 position (base position).

Figure 11:
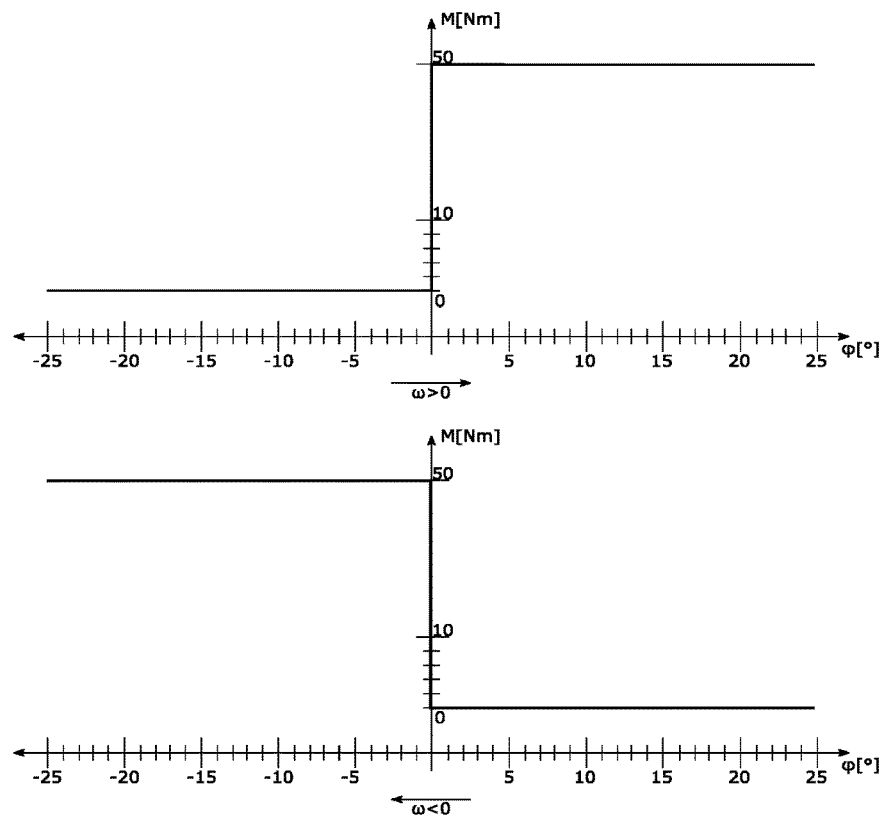

FIG. 11 shows the locking of the movement in both directions.

In the operating mode "kick and hold" the resistance is increased over a short angular range, given a specific angle. The resistance is also preserved as the joystick moves in reverse due to the resetting spring or the user's hand, and it is thus active in both movement directions. Alternately it may be active in one movement direction only. Then the joystick is held in the position. In the figure the torque spike begins at 15° and ends at 18°. This means, if the joystick is pushed beyond this range (here, more than 18°) and let go, it returns to 18° spring-loaded, and then stays at 18°. If is is positioned at less than 18°, it returns spring-loaded to the zero position.

Figure 12:
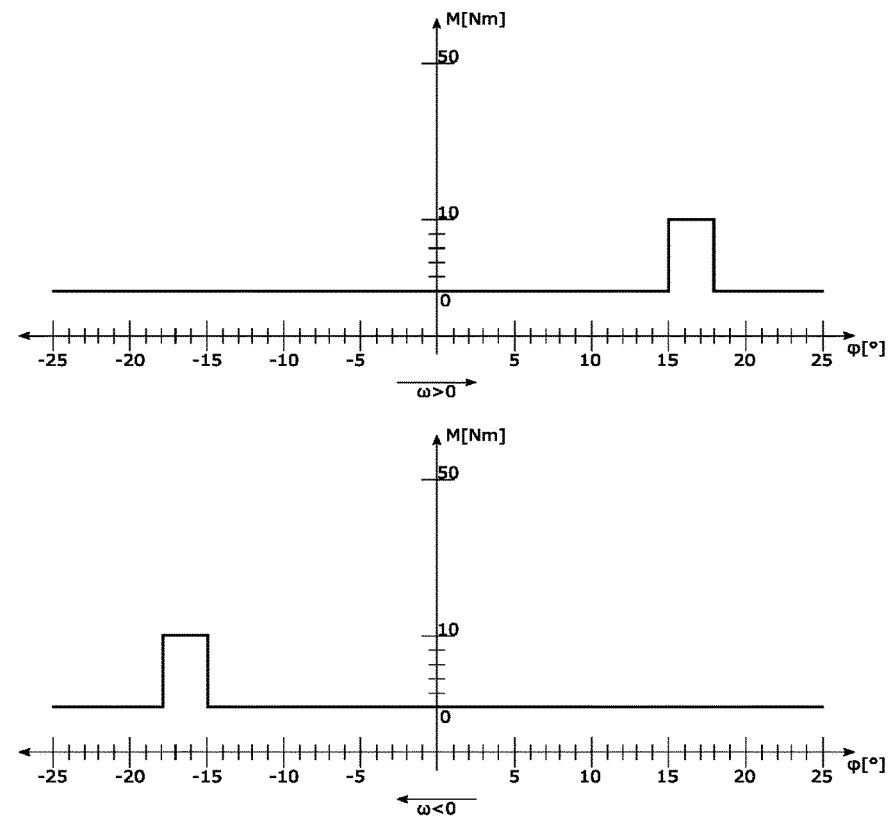

FIG. 12 shows "kick&hold" in the forward direction. The torque spike is provided in both pivoting directions (i.e. forward and back from the neutral position).

Figure 13:
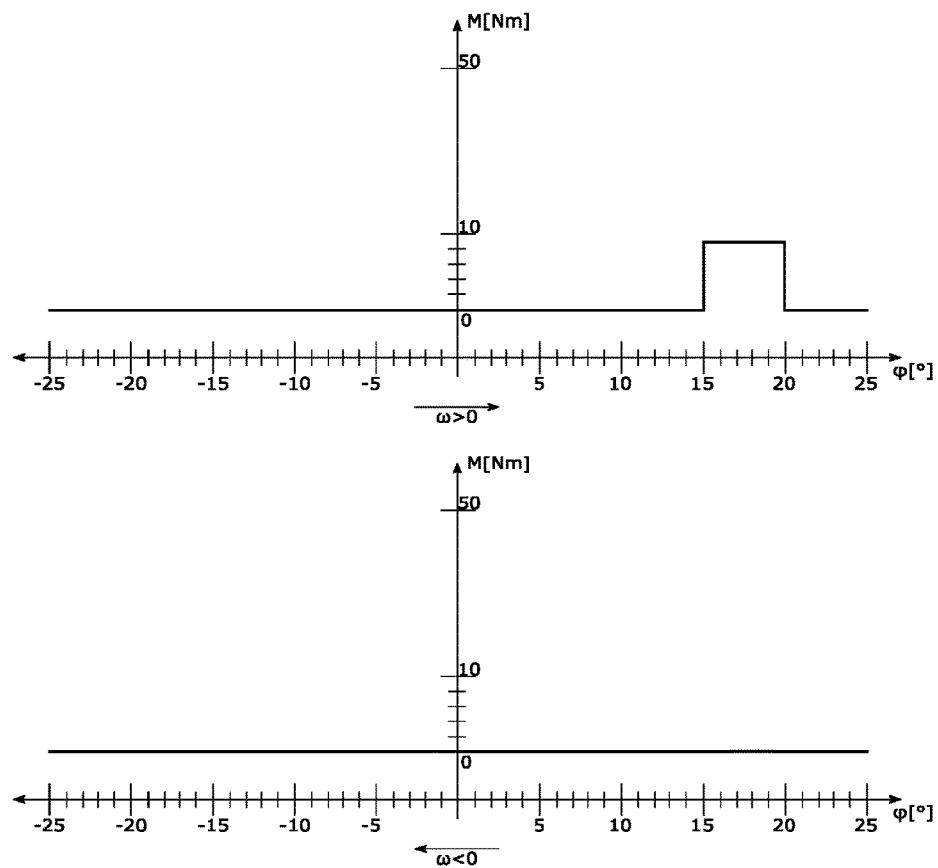

In the operating mode "kick down", a brief resistance is generated in one direction, the return movement goes up to the 0 position. In the example of FIG. 13, the torque spike must be overpressed in the range 15-20° and it can then move back, without braking. As the FIG. 13 shows, a brief resistance is generated in one direction, the return movement takes place without resistance.

In the operating mode freely selectable "slide gate", the adaptive joystick according to this invention copies e.g. the classical slide gate of a mechanical gear shift (e.g. H-shifter/slide gate). Such a slide gate mechanism 733 is shown in the FIG. 14.

According to this invention the MRF dampers/brakes are alternatingly actuated so that the joystick can only be moved e.g. in an H-pattern. When the operator/user wishes to move e.g. the joystick, or in this case the shift lever e.g. of a motor vehicle (car), diagonally from the shifting position 2 to the shifting position 3, this is prohibited by energizing the X-axis- and Y-axis MRF dampers (magnetorheological brake device). Firstly only movement of the Y-axis damper is permissible, the X-axis damper is locked. From the Y displacement center onward, only movement of the X-axis damper is permissible, the Y-axis damper is locked. Then, after a certain X distance, only movement of the Y-axis damper is enabled, until the position 3 is reached. The user thus feels as if he shifted the gears manually in a slide gate, as he is used to do in his car with a manual transmission. In fact, however, shifting takes place automatically through the electronics (Shift By Wire) and by simulating a slide gate by intelligent activating of the X- and Y-MRF axes.

What is important is that this be done quickly and harmoniously. In this way, different numbers of gear speeds, automatic shift levers on one, two or three levels, sequential shift patterns and various designs can be generated virtually. Various actuating forces, movement paths, and also classic car shift systems can be simulated. Thus, the user's (customer's) preferred shifting method can always be applied/preset for example in a rental vehicle or leased vehicle, which enhances the operating comfort and reduces operating errors.

In the operating mode "increasing resistance" the resistance increases in particular linearly or polynomially, thus indicating to the user by way of the resistance in which region he is located. The resistance for example increases with faster operation of a machine, or faster movement of the load, thus preventing accidents due to high speeds.

A combination of the modes is also possible. Thus, any desired modes can be combined. For example, one can combine a "ripple" and the "smart stop", so that movement of the joystick generates a ripple, and release makes it remain in place. The sensor technology also allows fast changes between modes when the direction is changed.

Expansion from one motion axis to two motion axes or three motion axes is also possible.

The following statements on the various operating modes will be explained for one motion axis each (forward and back; x-axis). However, they may be extended in analogy to a second or a third axis (left, right; y-axis, z-axis).

For use in gaming, certain requirements are set to the gaming joystick, such as a good stand even with fast movements (stable material, sufficient weight). The joystick should be ergonomic in design, be a good reproduction of real shift joysticks, and optionally show sufficient numbers of keys for special key assignments.

The resistance of the joystick differs depending on the gaming situation. Thus, it may be adapted to real systems (e.g. the flight simulator game joystick of a Boeing 747 behaves differently from that of a Cessna), and/or additional response/feedback of the system by vibrations is possible.

The resistance in the zero point is a significant criterion in particular for gamers (flight simulators): Real cockpit joysticks show very low resistance around the zero point, and good joysticks should imitate the real cockpit joysticks as perfectly as possible. An MRF brake device with a very low base momentum can keep the resistance around the zero point very low.

Vibration may be simulated "passively" by MRF brake, by generating a ripple at very short intervals, whereby the user feels vibration during movement.

Adaptivity is a particular advantage of the invention. One series component may be developed, which can be customized as desired. The production of small batches can be accelerated, and production costs can be saved.

At the same time a number of dummy knobs may be provided, which can be assigned individually. Customer-specific personalization is possible. Layouts for right-handed and left-handed users are possible. Personalized and/or intelligent feedback may be provided. The construction can be flexibly adapted. A small number of parts results in low cost.

The force of the spring or resetting spring can be neutralized. The force of the resetting spring used may in particular be "set" by damping the restoring force. Thus, the same spring strength may be used for different joysticks where different restoring forces are desired (in this case, movement counter to the spring would have to be actively supported). The adaptability also goes for different temperatures, contamination, aging, and wear. Independently of these changing parameters, the user will receive the same (familiar) haptic feedback and behavior.

It is also possible to set the action point and the forces. The adjusting force (action point) etc. can be adapted in relation to the customer or the customer's wishes. This is also dependent on the external state, i.e. on a smooth ground in a vehicle: lower momenta/forces. This reduces the operating force and user's fatigue. On rough roads or in uneven terrain: Higher forces/torques. This reduces wrong shifting respectively permits more precision of movement.

Another considerable advantage is the absence of stick-slip effect. Braking/damping is not performed by way of classical, friction-based brakes. The MRF dampers damp, depending on the electric current/magnetic field. When the magnetic field is switched off, the braking action is immediately cancelled, no matter the speed of movement. The braking force is not, or only slightly, speed-dependent, thus no jerky movements as in stick-slip effects can occur.

Multiple axes mode is also possible (multiaxes- and singleaxes mode). Each single rotary motion around a separate axis can be separately controlled via separate magnetorheological brake devices. Optionally, one single magnetorheological brake device is sufficient for braking rotary motions around different axes.

The same series component may serve to generate either joysticks showing one movement direction only (e.g. forward) or up to 4 directions (forward, back, left, right).

A haptic performance indication is possible. The performance provided by a machine/vehicle may be indicated e.g. by increased resistance.

A haptic feedback can considerably increase safety in operating machines, since the user does not need to shift his eyes to displays to identify problems.

Medical applications can also be advantageously implemented by way of the invention. Thus, robots can be controlled in an operation, e.g. to prevent incorrect cuts with a scalpel, or to play back different cutting forces. Laboratory apparatus in a laboratory can be controlled. Thus, for example sample holders can be automatically shifted under a microscope to prevent collisions.

Inadvertent actuation can be prohibited. Adaptation to external circumstances is possible. Inadvertent actuating can be prevented e.g. by generating a short ripple following extended non-use, as a standard procedure. Thus a user immediately feels it if he moves the joystick unintentionally. An external impact (e.g. going through a pothole) may also result in unwanted shifting. This can be prevented by increasing the force/torque, if such an event occurs which the entire system detects and analyzes, and forwards to the joystick control. For example: When a vehicle acceleration sensor senses amplified build-up movements, then the joystick actuating force/momentum is automatically adapted, so as to reduce maloperations.

The joystick may detect via Bluetooth, WLAN, ZigBee, NFC, Wi-Fi, LiFi, 3G, smart phone, smart watch, chip, key, etc. which user intends to use the joystick, and can thus adapt itself to that user's requirements/preferences, either preconfigured or automatically. The joystick respectively the pertaining control electronics may be provided for learning (Fuzzy Logic. Artificial Intelligence. Machine Learning), and thus continuously optimize the operating comfort and reduce operating errors.

Near field recognition systems (radar, ultrasound, camera-based, lidar . . . ) provide significant information to the control electronics of the joystick, thus influencing the haptic feedback.

A number of systems are networked, and external signals may be supplied (e.g. via Bluetooth, WLAN, ZigBee, NFC, Wi-Fi, LiFi, 3G, 5G . . . ), all the data is analyzed and results in corresponding real time feedback in the joystick. This allows more ease and safety of handling complex situations with the joystick, due to situation dependent feedback.

The angle sensor is preferably provided for more than 30,000 increments per rotation, and the regulation frequency of the control, more than 5 kHz.

The entire system may show a redundant structure, as the purpose requires (e.g. double motion trackers and rotary dampers . . . ).

If the control electronics detects imminent failure of a relevant sensor or damper early, this may be clearly signaled to the user in form of a haptic feedback (e.g. persistent, strong vibrations). This also applies if for example the sensor of the Y-axis fails and the user must, or wants to, actuate the X-axis. The adaptive joystick may adapt to these special or emergency situations and support the user optimally with the remaining operating options (with feedback).

The presently introduced input device 700 is equipped with brake devices 702 on the pivot axes 706, 716 provided, which brake devices are configured as, or at least comprise, a rotary damper 1 each. Thus the configurations and functions described above of the input device 700 can be implemented particularly advantageously.

FIG. 16 shows a schematic perspective view of the damper device 10 with a rotary damper 1, wherein the individual parts of the rotary damper 1 are recognizable. Such a rotary damper 1 is preferably used in the input device 700 according to the invention.

The rotary damper 1 is substantially formed of the components 2 and 3 with the pivot shaft 4 disposed or configured on the component 2. The pivot shaft 4 comprises a first end 31 and a second end 32. The component 2 shows over its circumference a number of arms 21, 22 and 23 which will be discussed in more detail in the description of the FIGS. 3 to 5.

The pivot shaft 4 may be provided with an engaging dog 4a (e.g. parallel key) for non-rotatable connection of the component 2 with a damped component. A wedge toothing, polygon connection or other force-fit or form-fit connection may be used instead of the parallel key. For mounting, the component 3 is pushed over the component 2 and then screwed to the cover 3a, the first end 31 of the pivot shaft 4 extending outwardly from what is shown as the right end of the component 3. Spacer sleeves 38 may be used to observe predetermined distances.

Basically, two variations are possible namely, the second end 32 of the pivot shaft extends outwardly on the other side of the component 3, alternately the second end 32 of the pivot shaft 4 is supported in the interior of the component 3, e.g. in the bearing 37 of the cover 3a consisting e.g. of aluminum or the like. The bearing 37 may be a low-cost sliding bearing or alternately, in the case of high or very high requirements on the base friction and service life, it may be a ball bearing or roller bearing. In the case of minimal requirements it may be dispensed with.

A rotary encoder or angle sensor 17 serves to capture the angular positions of the components 2 and 3 relative to one another. The angle sensor 17 may comprise a magnet stack and may be provided for contactless reading from outside the housing 30. The sensors may be disposed on coupling members or operatively coupled parts. A linear measuring system instead of a rotative measuring system may be used. The sensor 17 may be provided by, or may supplement, the sensor means 734.

The connecting lines 14 supply electric energy to the rotary damper 1.

Furthermore shown are from left to right, a collar end bearing, a shim ring, another collar end bearing, seals and bearings, spacer sleeve etc.

The components 2 and 3 may be conical in shape. The damping gap 6 does not need to be consistent in size or shape over the axial extension 16.

FIG. 17 shows a schematic cross-section in the assembled state, revealing that in the assembled state the component 3 forms a housing 30 of the rotary damper 1. The component 3 receives in its interior the substantial part of the component 2, so that after screwing the cover 3a onto the component 3, only the first end 31 of the pivot shaft 4 protrudes outwardly out of the housing 30. The engaging dog 4a is disposed on the part protruding outwardly of the pivot shaft 4. The component 3 comprises an outside component 13 and forms the housing 30. The component 2 comprises an inside component 12 that is surrounded by the outside component 13.

The pivot shaft 4 is supported by way of a bearing 37 in the vicinity of the first end 31 and the other end 32 is provided with a presently spherical mounting having a kind of bearing 37 so that the pivot shaft 4 only passes through outwardly. This allows to reduce the base friction and thus the base momentum so as to achieve higher sensitivity and better responsivity of the rotary damper 1 to loads.

A geometric axis 9 extends centrally through the pivot shaft 4. The electric connecting lines 14 also extend through the pivot shaft 4, passing from the outside (absent a slip ring) through the pivot shaft 4 to the electric coils 8 disposed in the interior of the housing 30.

In this simplistic cross-section of the rotary damper 1, two arms 21, 22 can be seen on the inside component 12 of the component 2.

The damping gap 6 is provided radially between the inside component 12 and the outside component 13 and extends over an axial length 16 which comprises a substantial part of the length of the inside component 12. The length 16 of the damping gap 6 is preferably at least half and in particular at least ⅔ of the length of the component 3.

Given large diameters 27 of the damping gap 6 it is in particular possible to provide each of the axial ends of the damping gap 6 with seals to contain the magnetorheological medium substantially, and preferably entirely, within the damping gap 6. Simple configurations may provide for a magnetic seal for magnetically sealing the very narrow gap still remaining between the components 2 and 3.

At least one seal is provided at the exit of the very thin pivot shaft 4 out of the housing 30. In this case the seal 11 is provided between the pivot shaft and the corresponding lead-through opening in the cover 3a.

Absent a separate seal at the axial ends of the damping gap 6 there is a very low base friction. The volume of the magnetorheological medium is determined by the volume of the damping gap 6 and the approximately disk-shaped volumes at the two axial front faces between the inside component 12 and the outside component 13 and it is small on the whole.

The volume of the damping gap 6 is very small since the radial height of the damping gap is preferably less than 2% of the diameter 27 of the presently cylindrical damping gap. The radial height of the damping gap is in particular less than 1 mm and preferably less than 0.6 mm and particularly preferably less than 0.3 mm. Given a length 16 of for example up to 40 or 50 mm and a diameter 27 of up to 30 mm and a gap height in the region of 0.3 mm, there ensues a gap volume of <2 ml, which allows to keep the manufacturing costs down. The volume of the magnetorheological medium is in particular less than 3 ml and preferably less than 2 ml.

A prior art transmission may be positioned between the pivot shaft 4 and the damped member, preferably a planetary gear largely without play, a micro transmission or e.g. a harmonic drive.

A disk may be positioned on the input shaft instead of a direct seat mounting or seat mounting via a coupling linkage. The disk or the outer disk diameter may be connected with the damped member (force-fit or effective fit) by means of at least one rope or belt. The connecting member may be connected for interaction with the damped member by means of deflections, gear ratio translation (e.g. block and tackle principle . . . ). This provides high structural flexibility in terms of attaching. Alternately an eccentric or cam disk may be used so as to make the forces/momenta dependent on the angular position. Alternately a continuous rope with a fixing spot may be used so as to enable positive control, i.e. both tractive and compressive forces can be transmitted. The transmission member (e.g. the rope) may be connected with the disk by way of force-fit or form-fit.

FIG. 18 shows a schematic perspective illustration of a part of the rotary damper 1 wherein the component 2 is illustrated absent the pivot shaft 4. In mounting, the illustrated part of the component 2 is non-rotatably coupled with the pivot shaft 4.

The component 2 comprises a plurality of radially outwardly protruding arms 21, 22, 23 etc. In this instance, eight arms are provided. Alternately, 6 or 10 or 12 or more arms are possible and preferred.

A coil 8 having at least one and presently a plurality of windings is wound around each of the arms. The electric coils are wound and connected such that adjacent spots of adjacent arms show opposite magnetic field poles when the coils 8 are energized.

FIG. 19 shows a cross-section of the rotary damper 1, the component 2 comprising the inside component 12 that is surrounded by the outside component 13 of the component 3. In this instance a substantially cylindrical damping gap 6 containing a magnetorheological medium 5 extends between the two components 2 and 3. The damping gap 6 is in particular entirely filled with the magnetorheological medium 5. At least one reservoir 15 may be provided in which a supply of magnetorheological medium is stored to enable compensating losses of certain amounts of the medium throughout the service life of the rotary damper 1. This reservoir 15 may for example be provided in the clearance between two arms 22, 23. Alternately the reservoir may be located external of the component 3.

In manufacturing, the coils 8 are first wound around each of the arms. Thereafter the remaining hollow spaces between the arms may be partially or entirely filled with a medium so that no magnetorheological fluid needs to be filled in. For example casting resin or the like may be poured in for filling up the hollow spaces. Casting resin or the like is lower in cost than the magnetorheological fluid. The function does not require filling up the hollow spaces. Alternately it is possible to apply a thin protective layer in the shape of a covering 34 to delimit the locations of the damping gaps 6, while the clearances between arms remain hollow.

The damping gap is preferably cylindrical. Alternately it is possible to dispose separating elements 29 in the coupling gap which subdivide the per se cylindrical coupling gap into a number of partial gaps. The separating elements 29 are preferably connected either with the component 2 or the component 3.

The coupling gap 6 itself may form the chamber 28 for the magnetorheological medium, or alternately the coupling gap 6 together with the reservoir 15 forms at least a substantial part of the chamber 28.

FIG. 20 shows a simplistic view of a field line pattern over the cross-section of the rotary damper 1 in FIG. 21. The field lines 36 pass approximately radially through the damping gap 6, run across an angular section through the component 3 before re-entering (the adjacent arm) next to the adjacent arm approximately vertically through the damping gap 6.

FIG. 20 illustratively shows that a high field line density prevails virtually over the entire circumference of the rotary damper so as to enable effectively damping a pivoting motion.

FIG. 21 shows another configuration of a rotary damper 1 whose functionality is basically identical to that of the rotary damper 1 described above. Unlike the previous configurations the rotary damper 1 according to FIG. 21 provides for the pivot shaft 4 to protrude outwardly both at the first end 31 and also at a second end 32. This is why the pivot shaft 4 is supported at both ends and sealed outwardly by means of seals 11. Again, magnetic seals 11*a* may seal the damping gap 6 in the axial directions.

In this and also in the other configurations the pivot shaft 6 may be standing upright, i.e. as an axle, wherein the housing 3 then pivots while damping and is operatively coupled with the damped member.

FIG. 22 shows an operating pedal 100, such as a brake pedal, a clutch pedal or an accelerator pedal with an integrated rotary damper 1.

So-called "X-by-wire" systems show increasing use in many fields of application. X-by-Wire designates the replacement of mechanical connections, signals and systems for manual control by guiding electric, electronic, optoelectronic or optical control signals between the operating members used and the executing actuators. A major drawback of these systems is the absence of feedback, which is a serious disadvantage e.g. when operating the X-by-wire foot brake of a vehicle (e.g. motor vehicle, truck, agricultural vehicle, utility vehicle, crane, building vehicle). For example "braking by feel" is thus no longer possible. Overbraking may result in instable driving situations, overloads, or uncomfortable braking manoeuvres. The rotary damper 1 presently described can simulate the braking counterpressure or the corresponding momentum, which is otherwise generated mechanically, thus simulating a "normal" braking or operational feel in the pedal.

This is particularly advantageous in hybrid vehicles. Hybrid vehicles may be provided with pedals and operating members connected by "X-by-wire", or alternately mechanically. In these vehicles the brake energy recuperation causes changing actuating forces and/or actuating momenta respectively actuator travels. For example when a hybrid vehicle travels downhill, reducing the speed preferably involves the attempt to transmit the smallest amount of energy possible to the wheel brakes (heat) and the largest amount possible to the batteries (electric energy is fed into the accumulator, a storage capacitor (super capacitor), or a flywheel storage).

It may thus happen that the batteries are empty as the ride downhill begins and the vehicle can virtually be "braked" by brake energy recuperation only. This only requires a very slight pressure applied on the brake pedal, and the rider receives a very low counterforce although the vehicle markedly retards by way of the brake energy recuperation, e.g. of the electric motor (generator) actuated in parallel. The more energy is stored in the electric energy storage device, the less braking is possible involving brake energy recuperation. This results in the fact that the "braking point" and the "braking force" in the pedal vary continuously which is very unpleasant and confusing or even downright dangerous for the operator. The rotary damper presently described can generate the differential torque/force corresponding to the energy distribution and can thus simulate in the pedal a "normal" feel that always remains constant.

In the case of an operating lever such as an accelerator pedal the subsequent conditions can at least partially be taken into account and converted into an individual haptic feedback by means of the rotary damper presently described.

For example when a vehicle in front is recognized, a higher counterforce in the operating lever may be set in the case of a too close distance or if the vehicle in front decelerates). Alternately an in particular early danger warning relating to the vehicle in front is possible. For example accelerating may then be prohibited. This is in particular realized by an increased counterforce up to a locked pedal.

The accelerator pedal is for example connected with the overall vehicle system and e.g. a cloud (in particular relating to the navigation system, engine management system, optimal shifting time, start-stop system, electric driving in hybrid vehicles, adaptive operation, or the like). A counterforce/momentum depending thereon in the operating member is preferably set.

Alternately, near field and/or surroundings sensors may be provided and referred to. Then an adaptive counterforce is in particular set.

This applies accordingly to the brake pedal or other operating members.

Furthermore the rotary damper enables a feedback and damped resetting and/or actuating of the pedal which enables advantageous operation. A combination with a return spring is likewise possible.

The actuating travel and thus the pivoting angle is limited by the mounting space.

In the case of the operating pedal 100, the operating pedal may (also) damp vibrations originating from the outside such as with use on vibrating construction machinery etc. These or other acting vibrations might cause a certain actuation of the operating pedal. The rotary damper respectively the assigned or integrated control device can differentiate whether these vibrations originate from the vehicle or from actuating movements by the operator.

FIG. 23 shows a prosthesis with a damper device 10 comprising a rotary damper 1. The components 2 and 3 are connected with prosthesis parts and damp the relative motions.

On the whole the damper device 10 of FIG. 23 provides a knee joint suitable for effective damping.

The FIGS. 24 and 25 show simplistic embodiments of a control system of the damper device 10.

In the scope of the present invention the term controlling is understood to include regulation so that the controlling system is preferably also suitable and configured for regulation.

In this instance only three switched rotary dampers 1 acting as actuators are shown. However, four or five or 10 or a plurality of controlled actuators may be provided. Alternately it is possible to provide only one actuator or two actuators.

The shown dampers 1 are operatively coupled with a computer 201. The computer 201 receives for each damper 1 at least one actuator signal 204 describing at least one characteristic quantity for at least one state of the damper 1. An actuator signal for example comprises a characteristic quantity captured by the rotary encoder 17. The actuator signal may also comprise a characteristic quantity captured by at least one momentum sensor and/or at least one current sensor. Other suitable sensor types are likewise possible. Particularly preferably the computer 201 takes into account a plurality of actuator signals 204 originating from different sensors.

The computer 201 preferably also takes into account at least one piece of system information 203 that describes at least one system quantity. The system information 203 comprises for example acceleration values of the drum 101 and/or of the drum housing 109 and/or further system quantities.

By way of the provided actuator signals 204 the computer 201 determines for the dampers 1 at least one characteristic quantity each for an optimal moment of resistance. The characteristic quantities for the determined moments of resistance of the dampers of an actuator are each provided for a current/torque regulation 202 assigned to a damper 1.

The current/torque regulation 202 outputs for each damper 1 at least one control voltage 205 in dependence on the provided moments of resistance. Alternately, actuating signals are possible showing quantities suitable for controlling the damper 1 other than, and/or additionally to, the voltage. The pertaining damper 1 is adjusted by way of the control voltage 205.

The control shown in the FIG. 24 is configured as a central control 200. The central control 200 comprises the computer 201 and the current/torque regulation 202 assigned to the pertaining dampers 1.

A configuration not shown may provide for a decentralized configuration of the current/torque regulation 202 assigned to the pertaining dampers 1. The computer 201 maintains its central status. To this end the current/torque regulation 202 is disposed in particular separately and spatially separate from the computer 201.

FIG. 25 shows a control configured as a decentralized control 206. At least one dedicated computer 201 and at least one dedicated current/torque regulation 202 is assigned to each of the dampers 1. It is possible for the computer 201 and the current/torque regulation 202 assigned to a damper 1 to be configured for autonomous action. Alternately a configuration is possible in which the decentralized control 206 also takes into account system information 203.

FIG. 26 shows an apparatus configured as a training apparatus 300 or fitness apparatus comprising a damper device 10. The training apparatus 300 is configured as a stationary bicycle. It comprises a muscular energy-actuated operating member 301 which is configured as a pedal crank device having one pedal and one bottom bracket or pedal bearing. The rotary damper 1 can damp the movement of the operating member 301.

The damping characteristics of the rotary damper 1 can be adjusted multiple times even during one rotation. The torque required for rotating the operating member 301 is in particular adjusted. A control device 302 is provided for adjusting the damper 1. This device 302 is provided by the control device 703.

LIST OF REFERENCE NUMERALS

| | |
|---|---|
| 1 | rotary damper |
| 2 | component |
| 3 | component |
| 3a | cover |
| 4 | pivot shaft |
| 4a | engaging dog |
| 5 | magnetorheological medium |
| 6 | damping gap |
| 7 | magnetic field generating device |
| 8 | electric coil |
| 9 | axle, axis |
| 10 | damper device |
| 11 | sealing device |
| 12 | inside component |
| 13 | outside component |
| 14 | connecting line |
| 15 | reservoir |
| 16 | axial length |
| 17 | rotary encoder |
| 18 | coil |
| 19 | end of 21, 22 |
| 20 | suspension device |
| 21 | arm |
| 22 | arm |
| 23 | arm |
| 24 | pole |
| 25 | pole |
| 26 | radial height of 6 |
| 27 | diameter of 6 |
| 28 | chamber |
| 29 | separator, separating element |
| 30 | housing |
| 31 | end of 4 |
| 32 | end of 4 |
| 33 | permanent magnet |
| 34 | cover |
| 35 | hollow space, filler |
| 36 | field line |
| 37 | bearing |
| 38 | spacer sleeve |
| 60 | operating pedal |
| 100 | apparatus |
| 112 | prosthesis |
| 200 | central control |
| 201 | computer |

-continued

| | |
|---|---|
| 202 | current/torque regulation |
| 203 | system information |
| 204 | actuator signal |
| 205 | control voltage |
| 206 | decentralized control |
| 300 | training apparatus |
| 301 | operating member |
| 302 | control device |
| 700 | input device |
| 701 | operating device |
| 702 | brake device |
| 703 | control device |
| 704 | supporting structure |
| 705 | operating lever |
| 706 | pivot axis |
| 707 | resetting unit |
| 708 | transmission stage |
| 710 | input receiving unit |
| 711 | joystick |
| 713 | sequence |
| 714 | joint |
| 716 | pivot axis |
| 717 | neutral position |
| 718 | belt drive |
| 720 | input system |
| 721 | switch |
| 723 | ripple |
| 728 | rotation axis |
| 733 | slide gate mechanism |
| 734 | sensor means |
| 743 | length |
| 753 | distance |

The invention claimed is:

1. An input device, comprising
an operating device, a magnetorheological brake device, and a control device for activating said brake device;
said operating device including a supporting structure and an operating lever mounted to said supporting structure for pivoting around at least one pivot axis;
at least one sensor for detecting a pivot angle of said operating lever;
said brake device being coupled with said pivot axis for enabling a controlled damping of a pivoting motion of said operating lever by said control device;
said control device is configured to decelerate and to enable the pivoting motion of said operating lever by way of said brake device in a controlled sequence, and in order to realize such a sequence, to set different levels of deceleration torques for the deceleration and enabling, and to set the deceleration torques for the deceleration and/or the enabling as a function of time and/or as a function of a pivoting angle of said operating lever;
said control device is configured to set different deceleration torques of the sequence at such a frequency that the pivoting motion of said operating lever is damped by way of controlled vibrations having a frequency of at least 50 Hz;
said brake device being a rotary damper having two components, including an inside component and an outside component radially surrounding said inside component, at least in sections thereof;
said two components defining an annular and circumferential damping gap therebetween that is bordered radially inwardly by said inside component and radially outwardly by said outside component and that is at least partially filled with a magnetorheological medium;
a magnet device configured for generating a magnetic field in said damping gap and for damping a pivoting motion between said two components that pivot counter to each other around an axis; and
a plurality of radially extending arms disposed on at least one of said two components, and an electric coil mounted to at least one of said the arms and having at least one winding extending adjacent said axis and spaced apart from said axis.

2. The input device according to claim 1, which further comprises a resetting unit configured to automatically pivot said operating lever back to a nominal neutral position following actuation, and wherein said control device is configured to cause said brake device to selectively damp a resetting motion carried out by said resetting unit.

3. The input device according to claim 2, wherein said control device is configured, after actuation, to automatically fix said operating lever in a current actuating position, and to cause said brake device to perform a controlled setting of a deceleration torque, which is equal to or higher than a resetting torque of said resetting unit in the current actuating position.

4. The input device according to claim 2, wherein said control device is configured, when a defined pivoting angle is reached, to increase a deceleration torque by way of said brake device through a specific pivoting angle range, and to fix said operating lever, following overcoming the pivoting angle range in a target position outside of a neutral position, and thereby to set, by way of said brake device, a controlled deceleration torque, which corresponds to, or is higher than, a resetting torque of said resetting unit in the target position.

5. The input device according to claim 1, wherein said operating lever is mounted on said supporting structure for pivoting about at least two pivot axes, and wherein at least one brake device is coupled with each pivot axis, and wherein said control device is configured, given a pivoting motion of said operating lever, to separately damp each of the pivot axes.

6. The input device according to claim 1, wherein said control device is configured to actuate said brake device in dependence on a pivoting angle of said operating lever acquired by said at least one sensor.

7. The input device according to claim 1, wherein said control device is configured to actuate said brake device depending on a control command of an input receiving unit to be coupled with said input device, and/or a control command from said input device itself.

8. The input device according to claim 7, wherein said control device is configured to convert the control command to a haptic signal that is perceptible on said operating lever, to provide the user with a perceptible haptic feedback in response to an input.

9. The input device according to claim 1, further comprising a slide gate mechanism, wherein said control device is configured to simulate said slide gate mechanism, by a combination of a plurality of detent positions and a neutral position and a plurality of blockings of said operating lever dependent on a pivoting angle thereof.

10. The input device according to claim 1, wherein said brake device is coupled with the pivot axis via at least one transmission stage having a gear ratio between 2:1 and 5:1.

11. The input device according to claim 10, wherein said transmission stage comprises at least one belt drive, which couples the pivot axis with a rotation axis of said brake device.

12. The input device according to claim 1, wherein said two components are pivotable relative to one another only by a limited pivoting angle.

13. The input device according to claim 1, configured as a joystick.

14. A method for operating an input device, the method comprising:
provide a pivotable operating lever for the input device and, when the operating lever is pivoted about a pivot axis, at least in part by manual activation, accepting an input into an input receiving unit that is functionally connected with the input device;
selectively damping and enabling a pivoting motion of the operating lever by way of a magnetorheological brake device coupled with the pivot axis; and
driving the brake device by a control device, at least depending on the pivoting angle of the operating lever and/or a time and/or an operating state of the input receiving unit, to perform controlled modification of the damping
decelerating and enabling the pivoting motion of the operating lever by way of the brake device in a controlled sequence via the control device;
setting different levels of deceleration torques for the deceleration and enabling in order to realize such a sequence, and setting the deceleration torques for the deceleration and/or the enabling as a function of time and/or as a function of a pivoting angle of the operating lever; and
setting different deceleration torques of the sequence, via the control device, at such a frequency that the pivoting motion of the operating lever is damped by way of controlled vibrations having a frequency of at least 50 Hz.

15. The method according to claim 14, wherein the operating state of the input receiving unit relates to at least one parameter selected from the group consisting of a power status, speed, acceleration, position in space, ambience, ground traveled, work performed, selected user profile, selected operating mode, activities of an assistance system and in particular operating assistance system, software-simulated situation, and input conditions for operating a program.

16. The method according to claim 14, wherein a pivotability of the operating lever is selectively increasingly damped or blocked, in the case of an operating state showing disturbances above a threshold value and/or endangerment, and/or if an assistance system actively intervenes in using the input receiving unit.

17. The method according to claim 14, which comprises, when an operating state with a parameter above a threshold value and/or danger above a threshold value, and/or an intervention by an assistance system by way of a controlled sequence of different deceleration torques is detected, generating a haptic signal during a pivoting motion of the operating lever.

18. The method according to claim 14, which comprises blocking a pivoting motion of the operating lever more intensely, variably but controlled, depending on a real operational situation and/or a software-simulated situation.

\* \* \* \* \*